United States Patent
Minakuchi et al.

(10) Patent No.: US 9,787,592 B2
(45) Date of Patent: Oct. 10, 2017

(54) PACKET TRANSFER SYSTEM AND PACKET TRANSFER METHOD

(71) Applicant: FUJITSU LIMITED, Kawasaki-shi, Kanagawa (JP)

(72) Inventors: Yu Minakuchi, Yokohama (JP); Hideyuki Matsuda, Atsugi (JP); Tomotaka Endo, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 143 days.

(21) Appl. No.: 14/608,387

(22) Filed: Jan. 29, 2015

(65) Prior Publication Data
US 2015/0263963 A1    Sep. 17, 2015

(30) Foreign Application Priority Data
Mar. 11, 2014   (JP) ................................ 2014-047762

(51) Int. Cl.
G06F 15/16      (2006.01)
H04L 12/851     (2013.01)
H04L 12/801     (2013.01)

(52) U.S. Cl.
CPC .......... H04L 47/2408 (2013.01); H04L 47/34 (2013.01)

(58) Field of Classification Search
CPC ..... H04L 47/34; H04L 47/2408; H04L 45/02; H04W 24/00
(Continued)

(56) References Cited

U.S. PATENT DOCUMENTS

| 2003/0081595 A1* | 5/2003 | Nomura | H04L 45/04 370/353 |
| 2004/0095889 A1* | 5/2004 | Chang | H04L 51/26 370/238 |

(Continued)

FOREIGN PATENT DOCUMENTS

| JP | 2000-69455 | 3/2000 |
| JP | 2003-259343 | 9/2003 |

(Continued)

OTHER PUBLICATIONS

WayBack Machine, "Port (Computer Networking)", Feb. 6, 2014, pp. 1-4.*

(Continued)

*Primary Examiner* — Andrew Lai
*Assistant Examiner* — Zhiren Qin
(74) *Attorney, Agent, or Firm* — Staas & Halsey LLP

(57) ABSTRACT

A packet transfer system includes a transmitter apparatus, a processing apparatus, a first transfer apparatus and a second transfer apparatus. The transmitter apparatus transmits a data packet including data and quality information associated with a transfer rate of the data. The first transfer apparatus performs a transfer process of the data packet received from the transmitter apparatus. The second transfer apparatus is connected to the first transfer apparatus through first and second routes, and transfers a data packet received from the first transfer apparatus. The first route is used for transferring a data packet including first quality information associated with a first transfer rate. The second route is used for transferring a data packet including second quality information associated with a second transfer rate. The second transfer apparatus releases the first route when reception of a data packet including the first quality information has been terminated.

6 Claims, 29 Drawing Sheets

(58) Field of Classification Search
USPC .......................................................... 370/392
See application file for complete search history.

(56) References Cited

U.S. PATENT DOCUMENTS

| | | | | |
|---|---|---|---|---|
| 2009/0135252 | A1* | 5/2009 | Matsuda .......... | G08B 13/19656 |
| | | | | 348/143 |
| 2010/0097470 | A1* | 4/2010 | Yoshida ........... | G08B 13/19641 |
| | | | | 348/159 |
| 2011/0187895 | A1* | 8/2011 | Cheng .................... | H04N 5/228 |
| | | | | 348/231.2 |
| 2012/0311072 | A1* | 12/2012 | Huang .................... | H04L 69/14 |
| | | | | 709/217 |
| 2015/0263963 | A1* | 9/2015 | Minakuchi .............. | H04L 47/34 |
| | | | | 370/392 |

FOREIGN PATENT DOCUMENTS

| | | |
|---|---|---|
| JP | 2013-522933 | 6/2013 |
| WO | 2012/144190 A1 | 10/2012 |

OTHER PUBLICATIONS

Japanese Office Action dated Aug. 1, 2017 in corresponding Japanese Patent Application No. 2014-047762.

\* cited by examiner

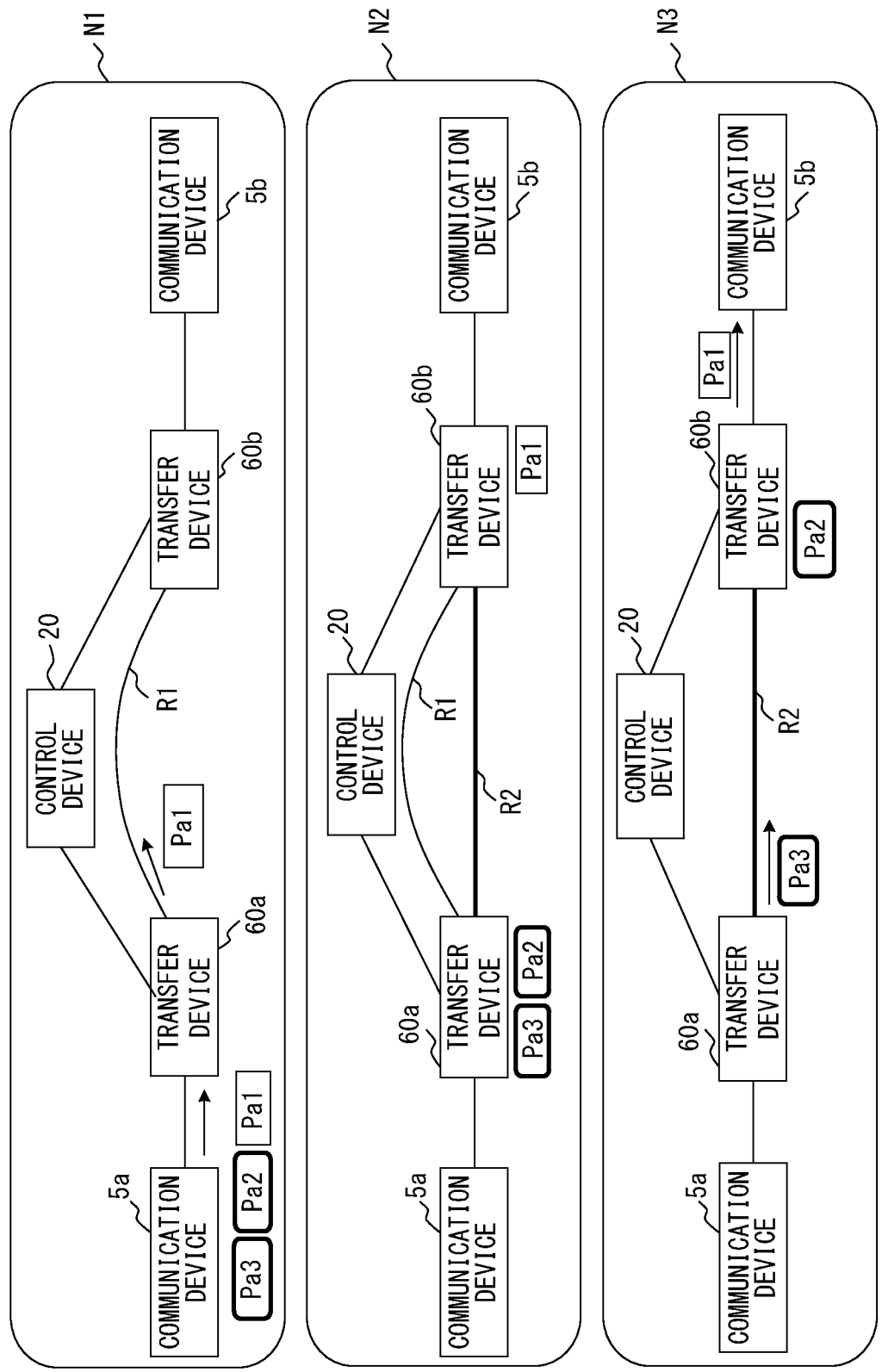
F I G. 1

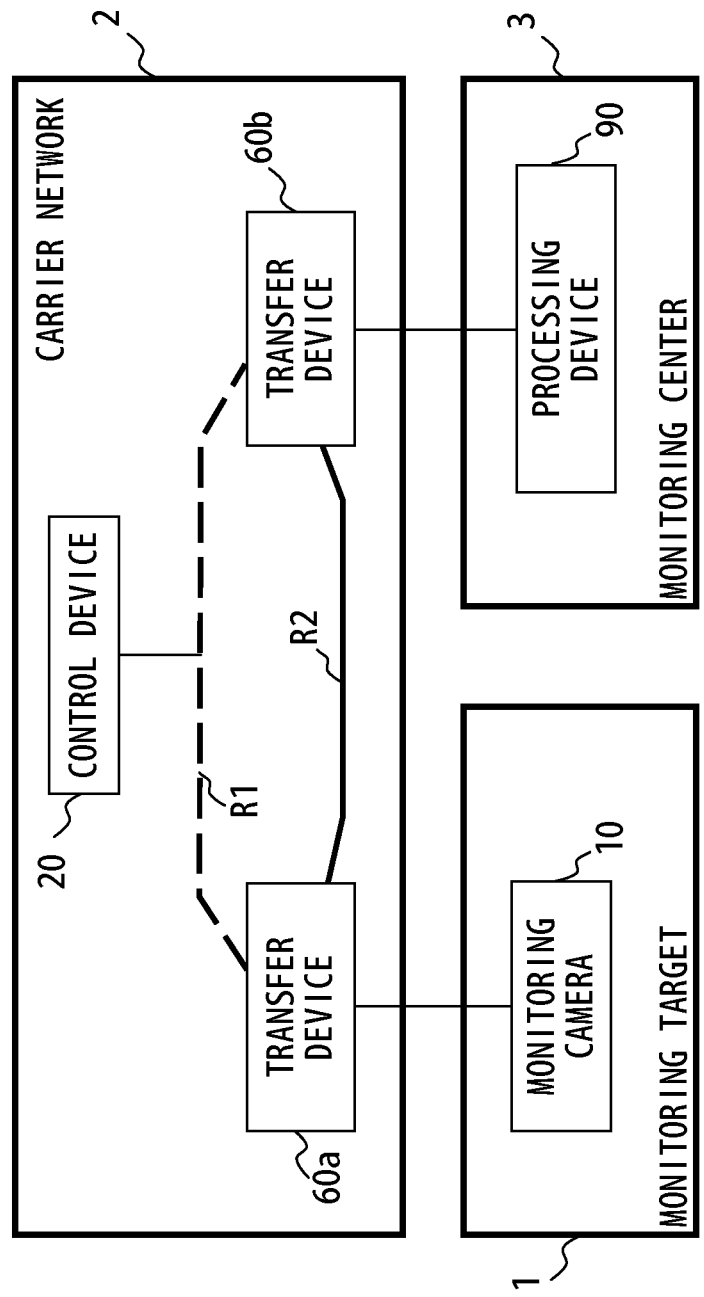
F I G. 2

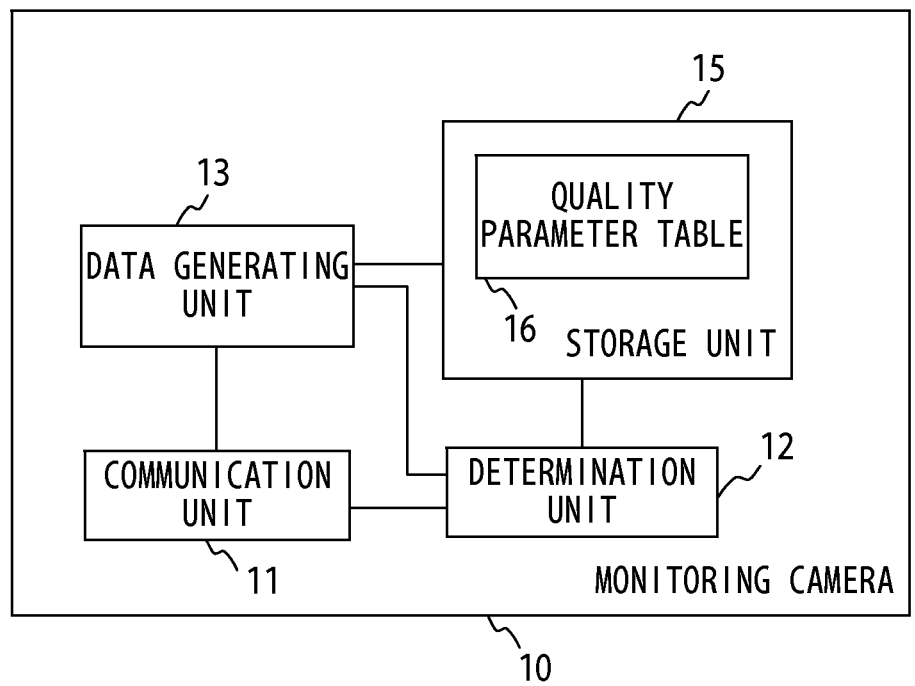
F I G. 3

| OPERATION MODE | COMPRESSION CODEC | TRANSFER RATE [kbps] | FRAME RATE [fps] | LOGICAL SCREEN SIZE | ... |
|---|---|---|---|---|---|
| NORMAL | H.264 | 256 | 2 | 600x480 | |
| ABNORMAL | H.264 | 1024 | 60 | 1024x800 | |

F I G. 4

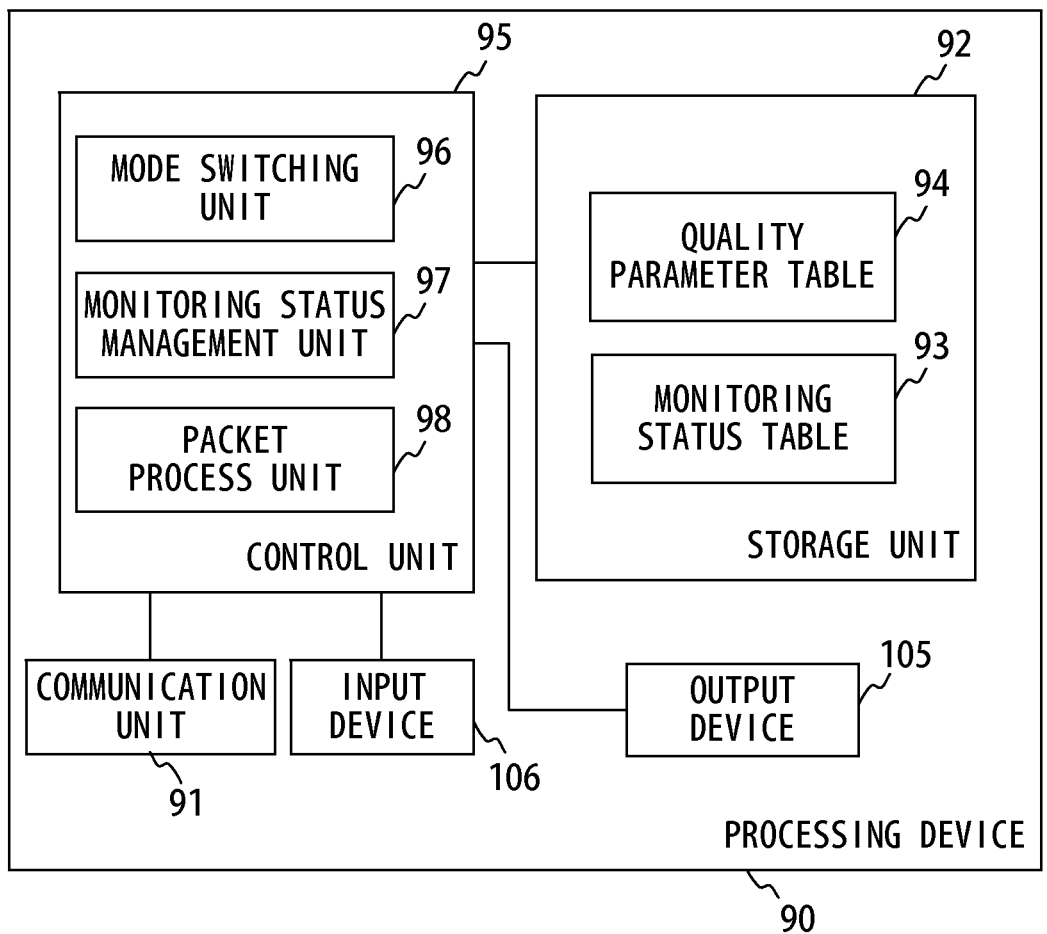
F I G. 5

| MONITORING TARGET | MONITORING CAMERA NUMBER | OPERATION MODE |
|---|---|---|
| OSAKA DATA CENTER | ODC#1 | NORMAL |
| OSAKA DATA CENTER | ODC#2 | ABNORMAL |
| HEADQUARTERS OF TOKYO | THO#1 | NORMAL |
| ⋮ | | |
| | | |

FIG. 6

| MONITORING CAMERA NUMBER | LAST PACKET NUMBER |
|---|---|
| ODC#1 | 123456 |
| : | |

F I G. 8

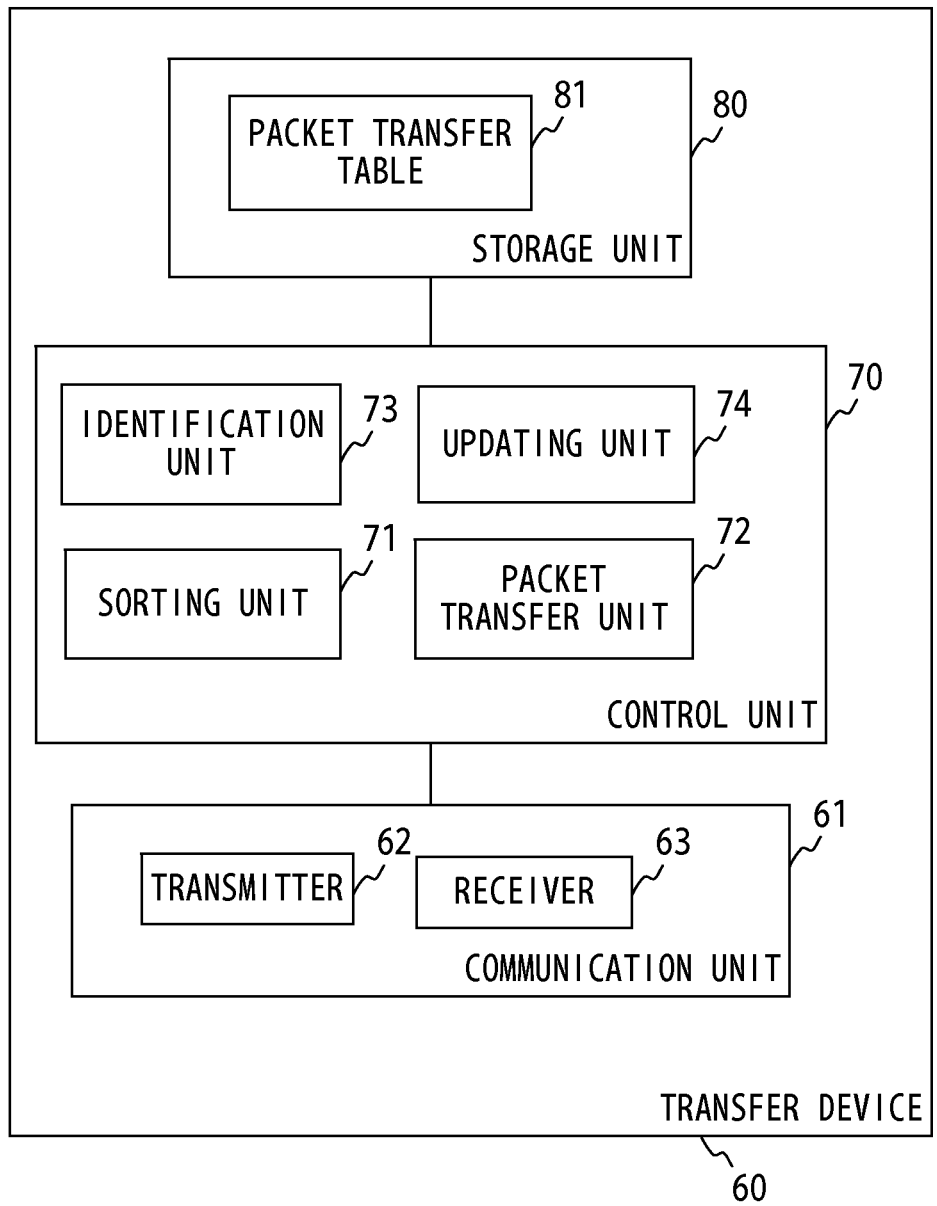
F I G. 9

| TRANSFER DEVICE 60a | | 81a |
|---|---|---|
| INPUT PORT NUMBER | TRANSFER DESTINATION PORT NUMBER | |
| 1 | 48 | |
| 2 | 15 | |
| 3 | 20 | |
| ⋮ | | |

| TRANSFER DEVICE 60b | | 81b |
|---|---|---|
| INPUT PORT NUMBER | TRANSFER DESTINATION PORT NUMBER | |
| 20 | 48 | |
| 22 | 1 | |
| 10 | 1 | |
| ⋮ | | |

F I G. 10

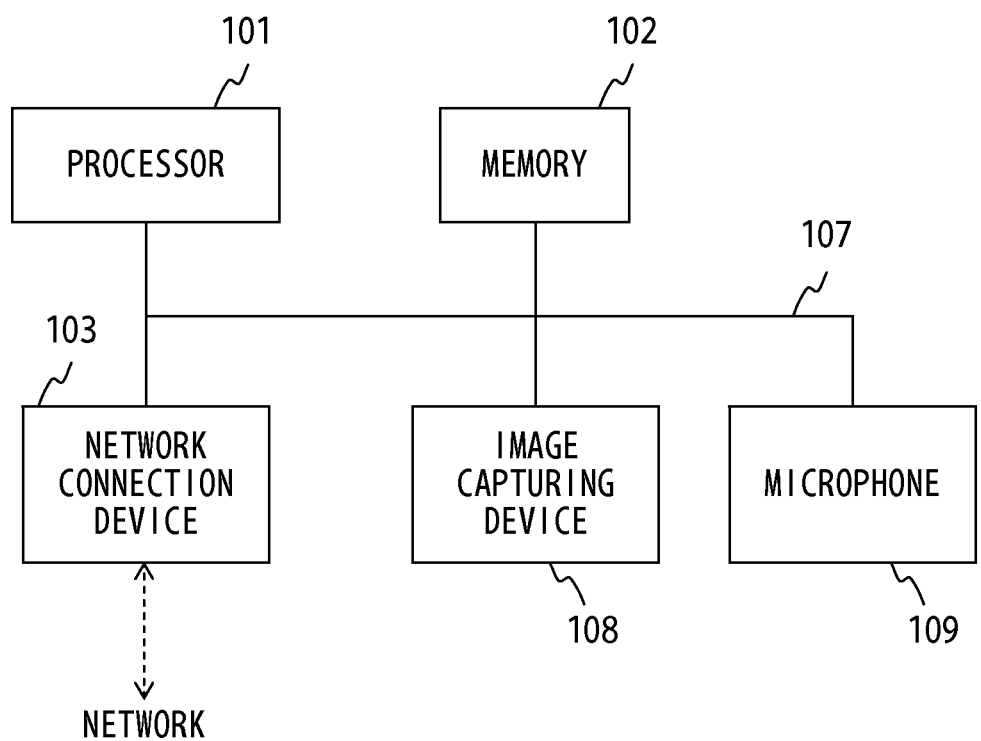
F I G. 1 2

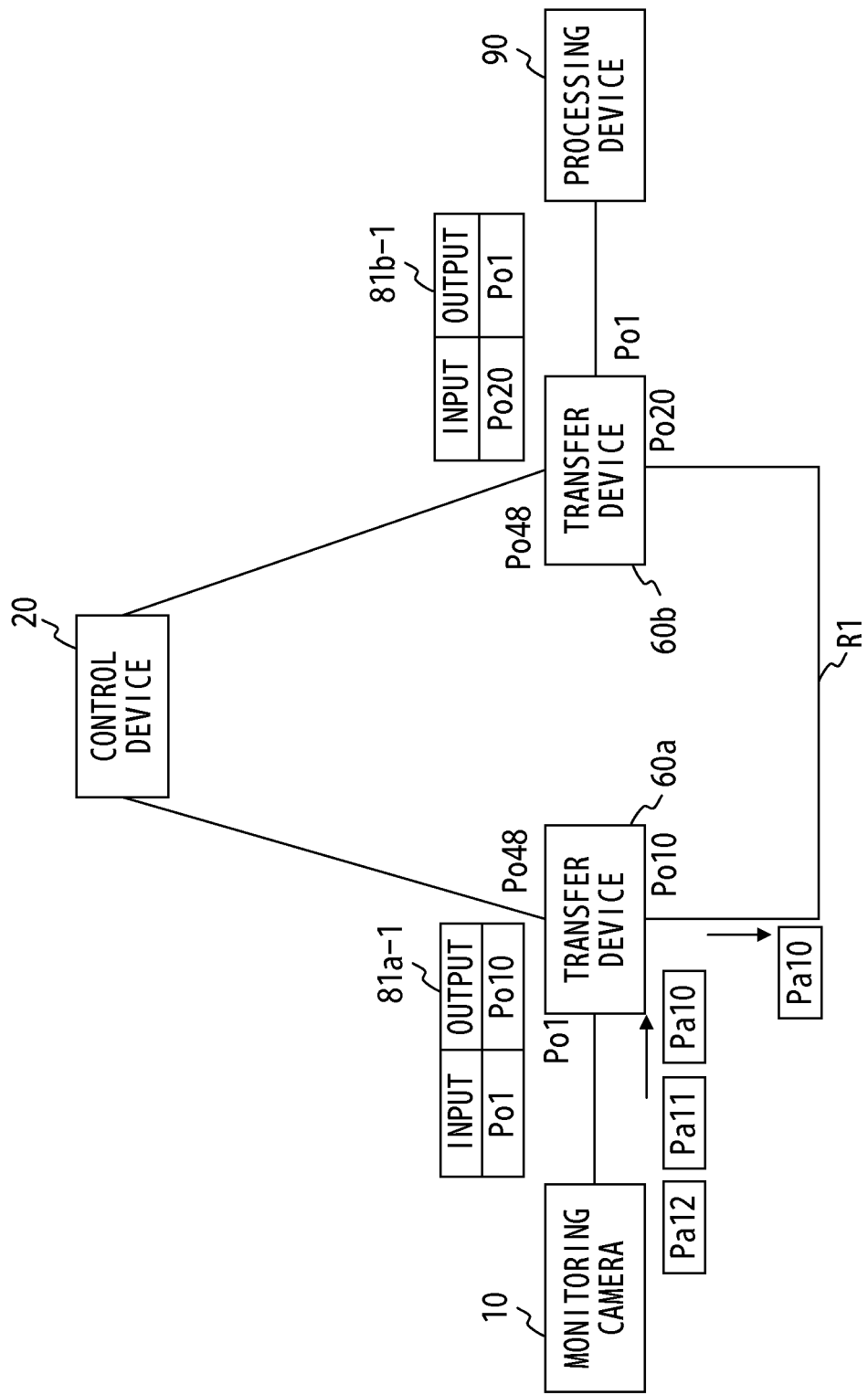
F I G. 14

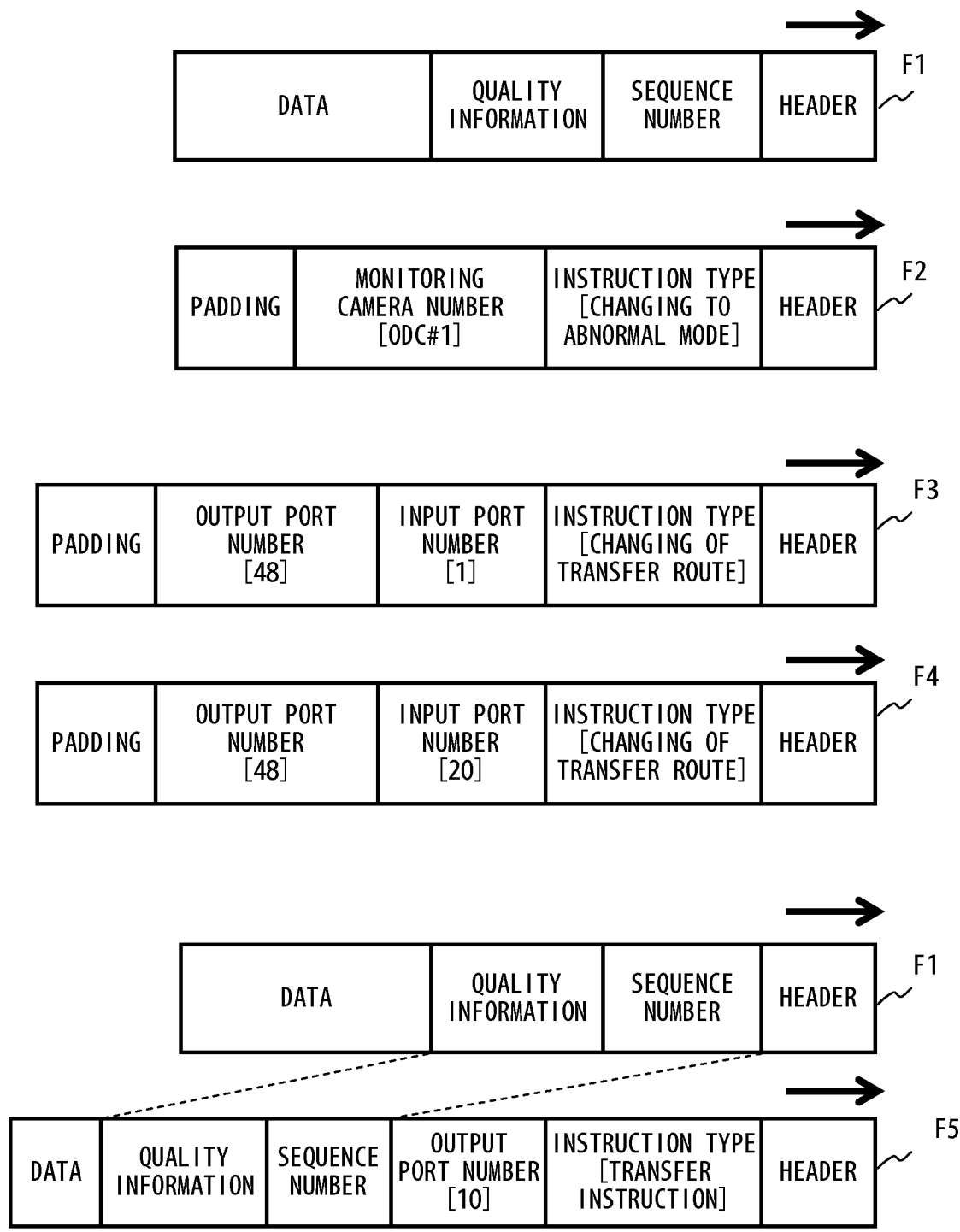
F I G. 1 5

| MONITORING CAMERA NUMBER | TRANSFER DEVICE 60a | | TRANSFER DEVICE 60b | |
|---|---|---|---|---|
| | CAMERA-SIDE PORT NUMBER | NETWORK-SIDE PORT NUMBER | NETWORK-SIDE PORT NUMBER | ANALYZER-SIDE PORT NUMBER |
| ODC#1 | 1 | 10 | 20 | 1 |
| ODC#2 | 2 | 15 | 22 | 1 |
| THO#1 | 3 | 20 | 10 | 1 |
| ⋮ | | | | |

F I G. 17

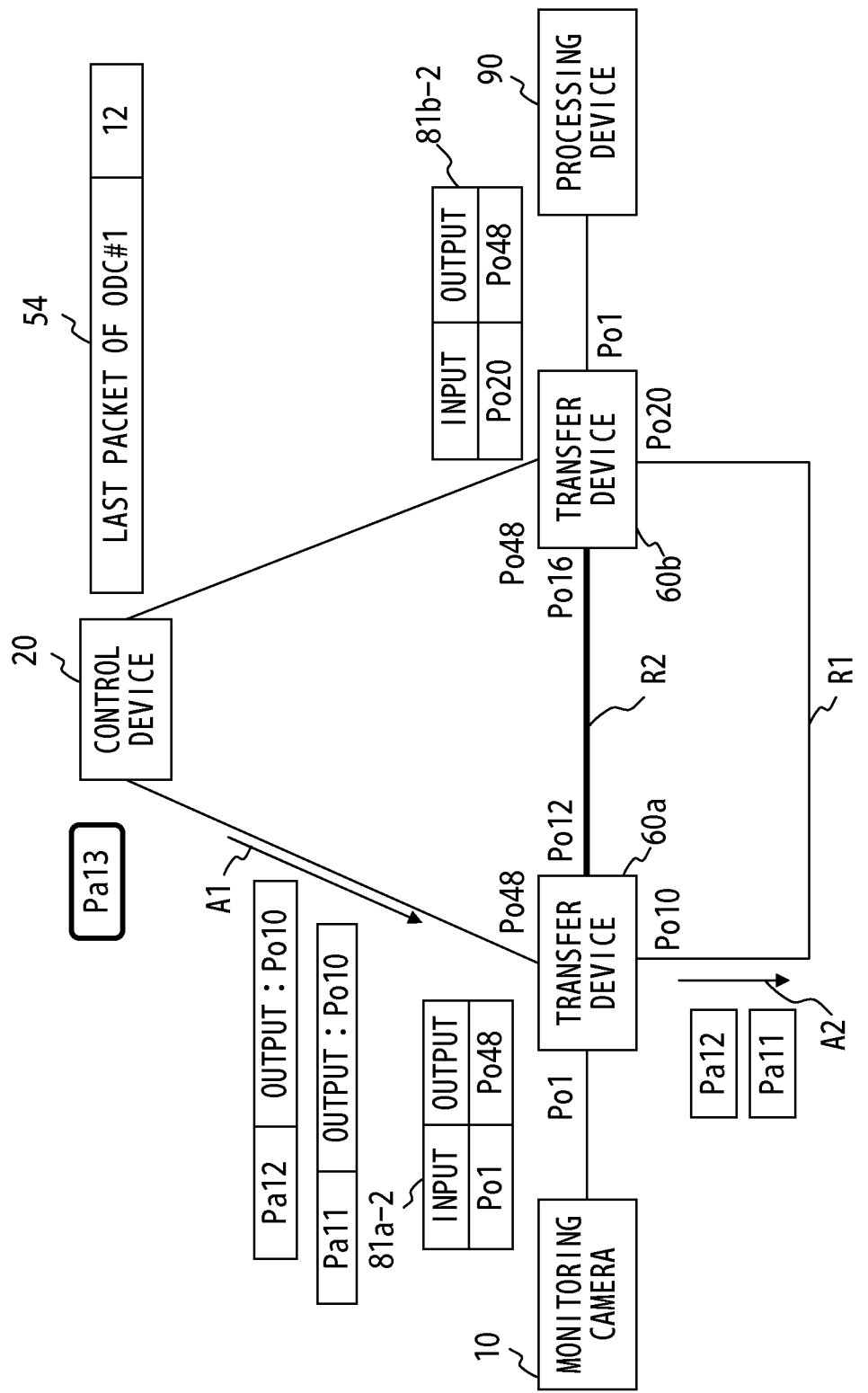
F I G. 19

| OPERATION MODE | TRANSFER RATE [kbps] | ... |
|---|---|---|
| NORMAL | 256 | |
| ABNORMAL | 1024 | |

FIG. 20

| No. | TRANSFER RATE THAT CAN BE USED [kbps] | UNOCCUPIED PORT NUMBER OF THE TRANSFER DEVICE 60a | UNOCCUPIED PORT NUMBER OF THE TRANSFER DEVICE 60b |
|---|---|---|---|
| 1 | 1024 | 12 | 16 |
| 2 | 512 | 13 | 17 |
| 3 | 2048 | 21 | 18 |
| ⋮ | ⋮ | | |

F I G. 2 1

| MONITORING CAMERA NUMBER | QUALITY INFORMATION | TRANSFER DEVICE 60a | TRANSFER DEVICE 60b |
|---|---|---|---|
| | | NETWORK-SIDE PORT NUMBER | NETWORK-SIDE PORT NUMBER |
| ODC#1 | NORMAL | 10 | 20 |
| | ABNORMAL | 12 | 16 |
| ⋮ | | | |

F I G. 2 2

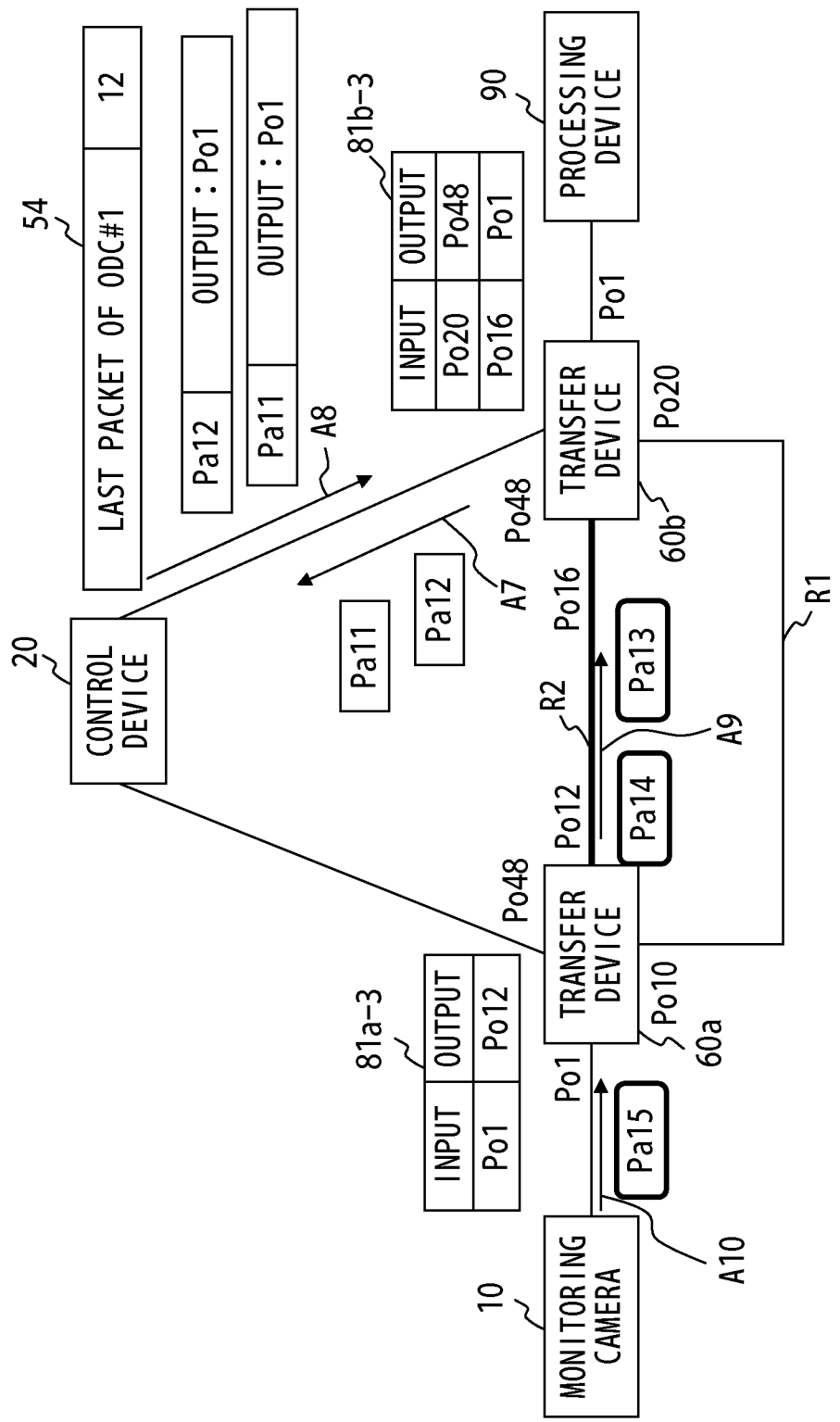
F I G. 24

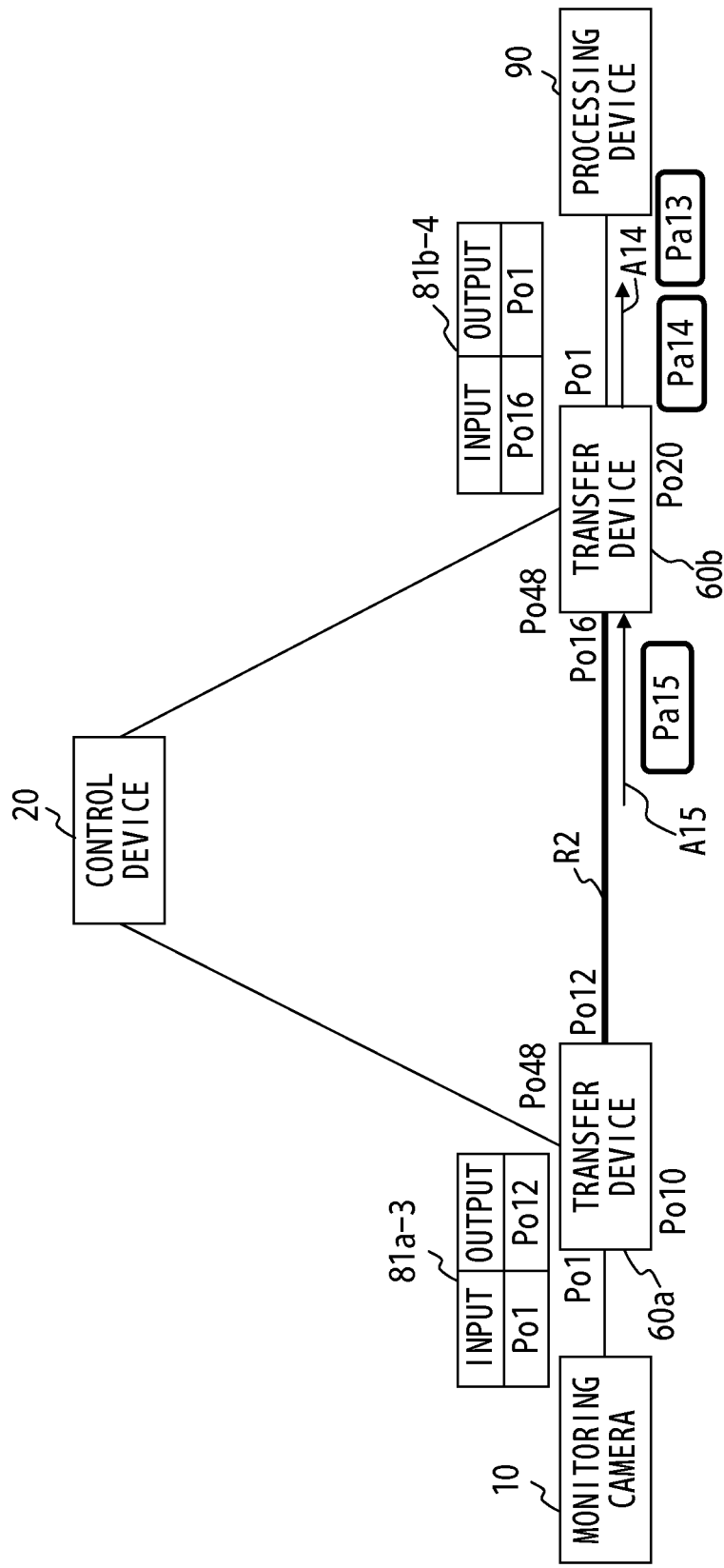
F I G. 26

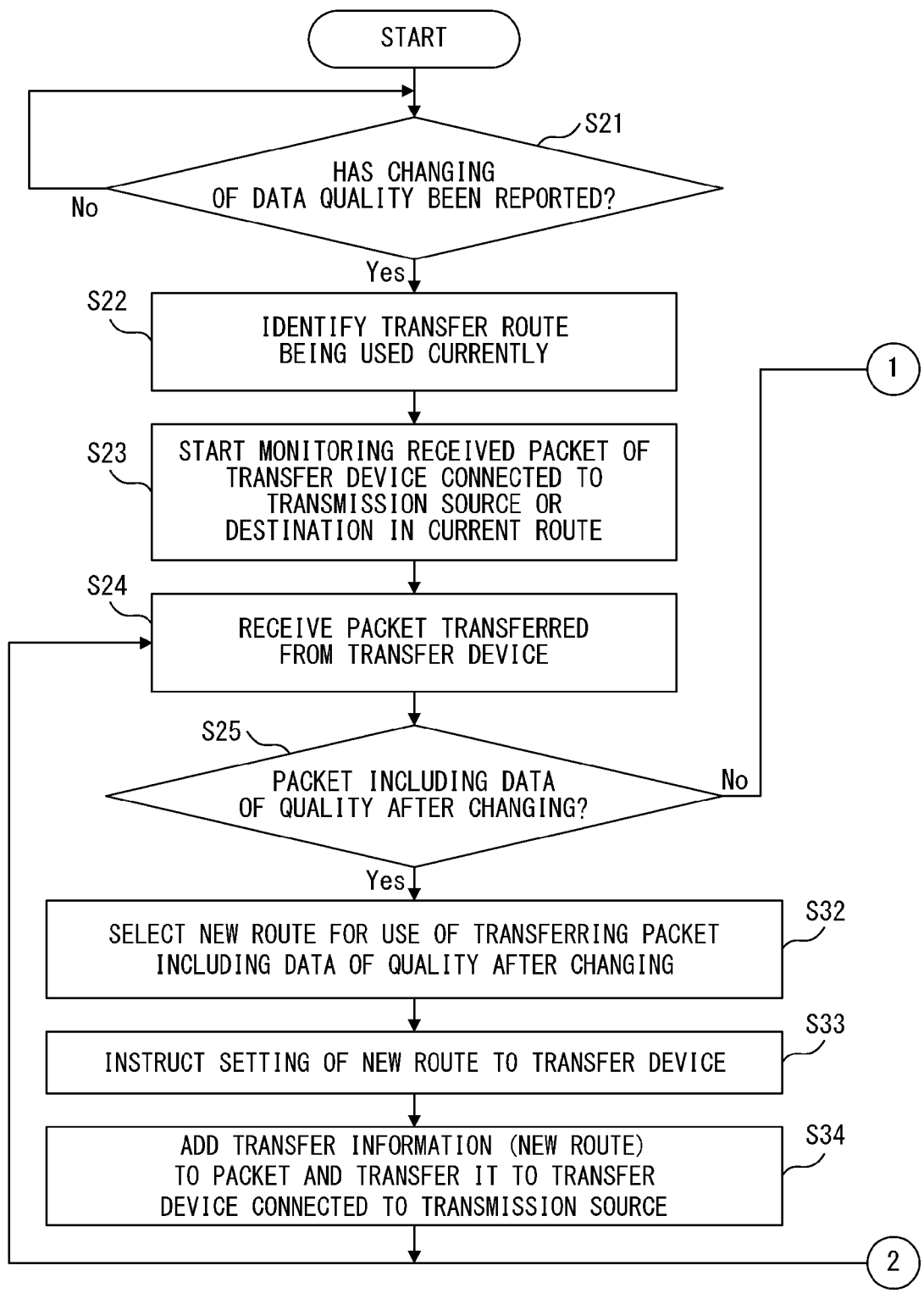
F I G. 28A

PACKET TRANSFER SYSTEM AND PACKET TRANSFER METHOD

CROSS-REFERENCE TO RELATED APPLICATION

This application is based upon and claims the benefit of priority of the prior Japanese Patent Application No. 2014-047762, filed on Mar. 11, 2014, the entire contents of which are incorporated herein by reference.

FIELD

The embodiments discussed herein are related to a method of transferring a packet in a network that includes a plurality of devices.

BACKGROUND

When data such as images or audio is transmitted and received via a network, the amount of data transmitted per unit of time (transfer rate) is in some cases changed in accordance with the quality of the data. For example, in a remote monitoring system using a monitoring camera, the quality of image data transmitted from a monitoring camera to a monitoring terminal is sometimes set to be low when no abnormality has occurred. In such a case, an operator who has found abnormality switches the quality of image data transmitted from the monitoring camera to the terminal device to high quality. Image data transmitted to the monitoring terminal after the execution of the switching process is better than that of images before the execution of the switching process, and accordingly the transfer rate of transmitted data becomes higher than that before the switching. In some cases, communication routes are also changed on an as-needed basis in accordance with the changing of the transfer rate of transmitted data.

As a related art, a system is known in which low quality image data of a monitoring subject is transmitted to a monitoring device via a low speed network in normal situations. In this system, when abnormality has been detected, high quality image data of the monitoring subject and abnormality report information are transmitted to the monitoring device via a high speed network. A system is also known that includes a plurality of input devices that compress and transmit images picked up by a monitoring camera, a plurality of output devices that expand the compressed images obtained from the input devices via the network and output the images to a screen, and a device that manages the correspondence between the input devices and the output devices.

Documents such as for example Japanese Laid-open Patent Publication No. 2003-259343, Japanese Laid-open Patent Publication No. 2000-69455, etc. are known.

In a system in which transfer rates change in accordance with the changing of the quality of transmitted image data, a plurality of lines with different transfer rates have to be kept ready to be used between the transmission source and the transmission destination of image data in order to switch routes in accordance with transfer rates. This makes communication efficiency lower than a case where one route connects the transmission source and the transmission destination of image data. Although examples of images from monitoring cameras are used in the above descriptions, similar problems may occur when the quality of transmitted or received image data is switched even in a case where the data is image data, audio data, etc., i.e., data other than image data obtained by a monitoring camera.

SUMMARY

According to an aspect of the embodiments, a packet transfer system includes a transmitter apparatus, a processing apparatus, a first transfer apparatus and a second transfer apparatus. The transmitter apparatus is configured to transmit a data packet including data and quality information associated with a transfer rate of the data. The processing apparatus is configured to process the data packet. The first transfer apparatus is configured to perform a transfer process of the data packet received from the transmitter apparatus. The second transfer apparatus is connected to the first transfer apparatus through a first route and a second route and is configured to transfer a data packet received from the first transfer apparatus to the processing apparatus. The first route is used for transferring a data packet including first quality information associated with a first transfer rate. The second route is used for transferring a data packet including second quality information associated with a second transfer rate. The second transfer apparatus releases the first route when reception of a data packet including the first quality information has been terminated.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of a transfer method according to an embodiment;

FIG. 2 illustrates an example of a network;

FIG. 3 illustrates an example of a configuration of a monitoring camera;

FIG. 4 illustrates an example of a quality parameter table;

FIG. 5 illustrates an example of a configuration of a processing device;

FIG. 6 illustrates an example of a monitoring status table;

FIG. 8 illustrates an example of a last packet number table;

FIG. 9 illustrates an example of a configuration of a transfer device;

FIG. 10 illustrates examples of a packet transfer table;

FIG. 12 illustrates an example of a hardware configuration of the monitoring camera;

FIG. 14 illustrates an example of a transfer process;

FIG. 15 illustrates examples of a packet format and a packet;

FIG. 17 illustrates an example of a use status management table;

FIG. 19 illustrates an example of a transfer process and setting of a route;

FIG. 20 illustrates an example of a transfer rate table;

FIG. 21 illustrates an example of an unoccupied route table;

FIG. 22 illustrates an example of a route management table;

FIG. 24 illustrates an example of a method of detecting timing for releasing a route;

FIG. 26 illustrates an example of releasing of a route;

FIGS. 28A and 28B are a flowchart illustrating an example of a process performed by a control device.

DESCRIPTION OF EMBODIMENTS

Figure 7:
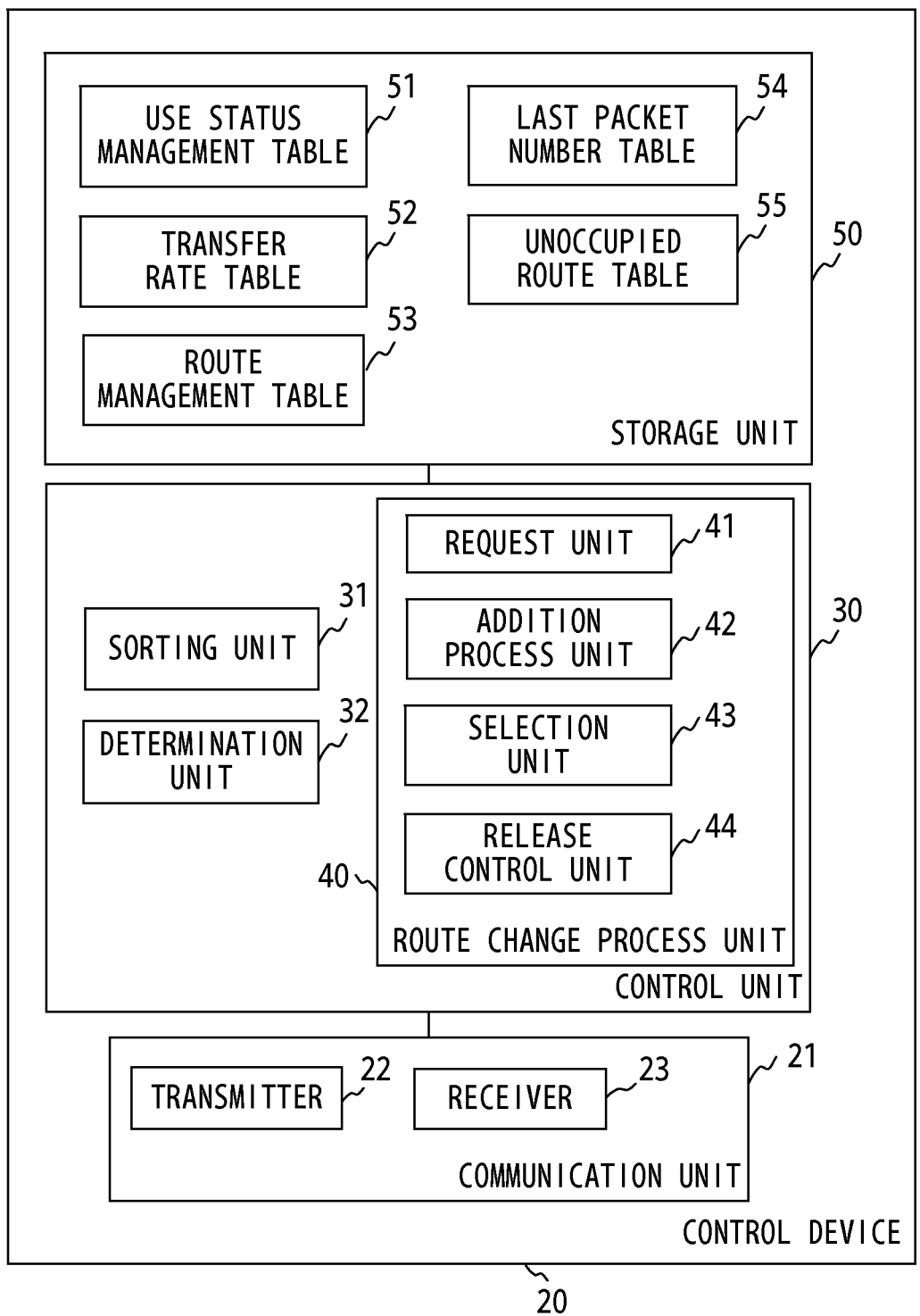
FIG. 7 illustrates an example of a configuration of a control device.

FIG. 1 illustrates an example of a transfer method according to an embodiment. Network N1 is an example of a network to which a transfer method according to an embodiment is applied. Network N1 includes communication devices 5 (5a, 5b), a control device 20 and transfer devices 60 (60a, 60b). The following example is an example in which the communication device 5a transmits image data and audio data to the communication device 5b. It is assumed that the control device 20 controls switching of transfer routes between the transfer device 60a and the transfer device 60b, transfer processes in the transfer device 60a and the transfer device 60b, and other processes.

The communication device 5a includes, in the packet addressed to the communication device 5, data addressed to the communication device 5b, quality information associated with the transfer rate of the transmitted data and the sequence number. Hereinafter, packets are distinguished from each other by character strings following "Pa", which are sequence numbers. For example, it is assumed that the packet with sequence number=1 is packet Pa1. It is also assumed that packet Pa1 includes first quality information. The communication device 5a transmits a generated packet to the communication device 5b. The packet transmitted from the communication device 5a to the communication device 5b is received by the transfer device 60a. In this situation, the control device 20 identifies the types of quality information included in the received packet for both the transfer device 60a and the transfer device 60b. For example, the control device 20 stores the fact that the quality information of packet Pa1 is first quality information. Meanwhile, the transfer device 60a transmits packet Pa1 to the transfer device 60b through route R1. It is assumed that route R1 is a route suitable for transmission and reception at a transfer rate associated with the first quality information.

When the quality of data transmitted from the communication device 5a to the communication device 5b has been switched, the transfer rate of the packets changes accompanying the change in the quality of data. It is assumed in the explanations below that the communication device 5a increased the quality of transmitted data after transmitting packet Pa1 addressed to the communication device 5b. In such a case, the transfer rate for the data transfer from the communication device 5a to the communication device 5b increases for packet Pa2 and subsequent packets. Accordingly, the quality information of packets Pa2 and Pa3 (second quality information) is different from the quality information of packet Pa1 (first quality information). In FIG. 1, boxes represent packets of first quality information while thick-line boxes having rounded corners represent packets of second quality information.

When packet Pa2 has arrived at the transfer device 60a, the control device 20 obtains the quality information of packet Pa2. Because the quality of the packet addressed to the communication device 5b is different from the first quality information, which has been used for the transmission before, the control device 20 secures route R2 to be used for the transmission and reception of packets of the second quality. The securing of route R2 is illustrated in network N2. Further, the control device 20 stores the fact that the packet that last arrives at the transfer device 60b among packets that are addressed to the communication device 5b and that are transmitted with first quality is packet Pa1.

In a figure illustrating network N2, the transfer device 60b received packet Pa1 through route R1. The control device 20 identifies the sequence number included in the packet received by the transfer device 60b, and thereby determines that packet Pa1 has arrived at the transfer device 60b. Because the last packet to arrive at the transfer device 60b among packets including the first quality information is packet Pa1, the control device 20 determines that the transmission and reception of packets including the first quality information between the transfer device 60a and the transfer device 60b has been terminated. Then, the control device 20 requests that the transfer device 60b release route R1.

As a result of the release of route R1, the transfer device 60a and the transfer device 60b are connected by route R2 as illustrated in network N3. The transfer device 60a transmits packets Pa2 and Pa3 to the transfer device 60b through route R2. The transfer device 60b transmits, to the communication device 5b, packet Pa1 received from the transfer device 60a. Further, when receiving packets Pa2 and Pa3, the transfer device 60b also transfers these packets to the communication device 5b.

As described above, in a the method according to an embodiment, when the transfer of packets of the quality transmitted and received through route R1 has been terminated, route R1 is released. Accordingly, routes are switched in accordance with the changing in transfer rates of packets transmitted and received between the communication device 5a and 5b and the communication in the network becomes more efficient.

Further, according to a method of the embodiment, routes are switched in accordance with transfer rates of data in packets. Because of this, gaps are not caused between timing for switching of the quality of image data and timing for switching of the routes used. Accordingly, even when the quality of image data etc. has been changed, packet losses do not occur due to a transfer rate of data exceeding the data amount that can be transferred per unit of time in the route.

Although an example of a transfer process for a case where a transfer rate is increased due to changing of the data quality has been explained by referring to FIG. 1, routes are changed in a similar process also in a case where a transfer rate is decreased due to changing of data quality.

FIG. 1 illustrates an example of communication in an arbitrary network, and for example the number of the transfer devices 60 connected to the control device 20 and the number of the communication devices 5 connected to the transfer devices 60 may be changed arbitrarily. Also, the network illustrated in FIG. 1 may be a logical network constructed by applying a technique such as Software Defined Networking (SDN) etc. Also, a logical network may be implemented by one computer or by a plurality of computers connected through a physical line. It is assumed that the logical network may be realized by an arbitrary technique such as Openflow by which the transfer device 60 transfers a packet in accordance with a transfer rule determined by the control device 20.

<Example of Network Configuration and Device Configuration>

FIG. 2 illustrates an example of a network. Hereinafter, the explanations will be given for an example in which the communication device 5a is a monitoring camera 10 and the communication device 5b is a processing device 90. The monitoring camera 10 has been installed in advance in a monitoring target 1 and the processing device 90 has been installed in a monitoring center 3. An operator determines whether or not abnormality has occurred in the monitoring target 1 by using images or audio provided by the processing device 90. The monitoring camera 10 and the processing device 90 are connected by a carrier network 2. The carrier network 2 includes a control device 20, the transfer device 60a and the transfer device 60b. Also, while there are a plurality of routes that can be set between the transfer devices 60a and 60b, one route is used between the transfer devices 60a and 60b except for a case when a process of changing the transfer rate of data transmitted from the monitoring camera 10 is performed. For example, even when routes R1 and R2 can be set between the transfer devices 60a and 60b as illustrated in FIG. 2, one of routes R1 and R2 is set during a term in which a process of changing the transfer rate of communication between the monitoring camera 10 and the processing device 90 is not being executed. Because the route from one of routes R1 and R2 that is not set for communication between the transfer devices 60a and 60b is in a released state, resources in the route in a released state may be used for communication between other devices that uses the carrier network 2.

Note that the carrier network 2 illustrated in FIG. 2 is an example, and the number of the transfer devices 60 included in the carrier network 2 may be changed in accordance with implementation. Also, an arbitrary number (including zero) of the transfer devices 60 may be included in routes between the transfer devices 60a and 60b although they are not illustrated in FIG. 2 for the sake of simplicity.

FIG. 3 illustrates an example of a configuration of the monitoring camera 10. The monitoring camera 10 illustrated in FIG. 3 changes transfer rates or resolutions of data in accordance with the types of an operation mode reported from the processing device 90. Hereinafter, explanations will be given for a case where two modes, i.e., a normal mode and an abnormality mode, can be set as an operation mode.

The monitoring camera 10 includes a communication unit 11, a determination unit 12, a data generating unit 13 and a storage unit 15. The storage unit 15 includes a quality parameter table 16. The communication unit 11 performs communication processes in relation to the monitoring target 1 or a device in the carrier network 2. The determination unit 12 determines whether or not it is requested by the processing device 90 that an operation mode be changed. When it is requested that an operation mode be changed, the determination unit 12 requests that the data generating unit 13 generates data in accordance with quality after the changing.

FIG. 4 illustrates an example of the quality parameter table 16. In the example illustrated in FIG. 4, information such as the type of the compression codec used for data, a transfer rate, a frame rate, logical window size, etc. is recoded in such a manner that it is associated with an operation mode. The data generating unit 13 uses an image pick up device, a microphone, etc. provided in the monitoring camera 10 so as to generate data to be transmitted to the processing device 90 in accordance with a condition specified by the quality parameter table 16. Accordingly, in a normal mode for example, data generated by the data generating unit 13 is data that was compressed by using H.264, and the transfer rate is set to 256 kbps (bits per second). Further, the frame rate is set to 2 fps (Frames Per Second) and the logical window size is set to 600×480 pixels. When an abnormality mode is set, the data generating unit 13 compresses, by using H.264, data whose transfer rate is 1024 kbps, whose frame rate is 60 fps and whose logical window size is 1024×800 pixels, and thereby generates data addressed to the processing device 90. The data generating unit 13 generates a packet including part of the obtained data, quality information, a sequence number, etc. as a packet to be transmitted to the processing device 90.

FIG. 5 illustrates an example of a configuration of the processing device 90. The processing device 90 includes a communication unit 91, a storage unit 92, a control unit 95, an output device 105 and an input device 106. The control unit 95 includes a mode switching unit 96, a monitoring status management unit 97 and a packet process unit 98. The storage unit 92 includes a quality parameter table 94. Also, optionally the storage unit 92 may further include a monitoring status table 93.

The communication unit 91 performs a communication process in relation to the carrier network 2 or a device in the monitoring center 3. The communication unit 91 outputs a received packet to the packet process unit 98. The packet process unit 98 treats as a process target a packet used for reproducing monitoring images or audio data transmitted from the monitoring camera 10 from among input packets. When processing packets, the packet process unit 98 refers to the quality parameter table 94 on an as-needed basis. The quality parameter table 94 includes the same data as that included in the quality parameter table 16, which was explained by referring to FIG. 4. Accordingly, on the basis of the quality parameter table 94, the packet process unit 98 can appropriately reproduce image data or audio data from packets received from the monitoring camera 10. The packet process unit 98 outputs to the output device 105 data of images or audio obtained by processing packets. The output device 105 outputs input audio or image in such a manner that the operator can confirm them.

The monitoring status management unit 97 associates the operation mode in which the monitoring camera 10 that is transmitting data to the processing device 90 is operating, with the identifier of the monitoring camera 10. Also, when there are a plurality of monitoring targets 1 in a network, the monitoring status management unit 97 associates, with the respective cameras 10, the identifiers of the monitoring targets 1 in which those cameras 10 are installed. When the processing device 90 includes the monitoring status table 93, the monitoring status management unit 97 records results of the associating process in the monitoring status table 93.

FIG. 6 illustrates an example of a monitoring status table. In the example illustrated in FIG. 6, the monitoring camera numbers are used as identifiers by which the respective monitoring cameras 10 can be identified uniquely. Because of this, the operator can recognize that for example the monitoring camera to which the number THO#1 has been assigned is used for monitoring the headquarters of Tokyo and that the current operation mode is a normal mode. Similarly, the operator can recognize that the monitoring camera to which the number ODC#2 has been assigned is used for monitoring the Osaka data center and that the current operation mode is an abnormal mode.

When changing an operation mode, the operator can input an operation mode changing request by using the input device 106. When an operation mode changing request has been input, the input device 106 outputs the input request to the mode switching unit 96. In accordance with the input information, the mode switching unit 96 generates a request packet for requesting that the monitoring camera 10 change the operation mode. Further, the mode switching unit 96 generates a report packet for reporting that a request that the monitoring camera 10 change the operation mode was made. The communication unit 91 transmits the request packet to the monitoring camera 10 and transmits the report packet to the control device 20. Through these processes, the processing device 90 requests that the monitoring camera 10 change the operation mode, and further reports, to the control device 20, the changing of the operation mode in the monitoring camera 10. Examples of a format of a request packet and a report packet and processes using these packets will be described later.

FIG. 7 illustrates an example of a configuration of the control device 20. The control device 20 includes a communication unit 21, a control unit 30 and a storage unit 50. The communication unit 21 includes a transmitter 22 and a receiver 23. The control unit 30 includes a sorting unit 31, a determination unit 32 and a route change process unit 40. The route change process unit 40 includes a request unit 41, an addition process unit 42, a selection unit 43 and a release control unit 44. The storage unit 50 includes a use status management table 51, a transfer rate table 52, a route management table 53, a last packet number table 54 and an unoccupied route table 55.

The transmitter 22 transmits a packet to the transfer device 60 that is included in the carrier network 2. The receiver 23 receives a packet from the transfer device 60 or the processing device 90 included in the carrier network 2. The receiver 23 outputs the received packet to the sorting unit 31.

The sorting unit 31 outputs to the determination unit 32 packets whose transmission source is the processing device 90 from among input packets, and outputs the other packets to the selection unit 43. The determination unit 32 determines whether or not a packet transmitted from the processing device 90 to the control device 20 is a report packet. When a report packet has been input, the determination unit 32 outputs, to the request unit 41, the fact that the changing of the operation mode has occurred in the monitoring camera 10 and the identifier of the monitoring camera 10 in which the operation mode has been changed.

The request unit 41 searches the use status management table 51 by using as a key an identifier reported from the determination unit 32 and obtains a transfer route of a packet to be transmitted, before the changing of the operation mode, by the monitoring camera 10 whose operation mode will be changed. Hereinafter, in order to facilitate the distinguishing between routes, a transfer route of a packet transmitted, before the changing of the operation mode, from the monitoring camera 10 whose operation mode will be changed is referred to as an "old route" in some cases. A route newly set accompanying the changing of the operation mode in the monitoring camera 10 is referred to as a "new route". Examples of the use status management table 51 and a process of identifying an old route will be explained later.

In order to request that the transfer device 60*a*, which is the starting point of the old route, transfer, to the control device 20, all packets that are to be transferred to the identified route, the request unit 41 generates a transfer request addressed to the transfer device 60*a*. Meanwhile, in order to request that the transfer device 60*b*, which is the ending point of the old route, transfer, to the control device 20, all packets received from the identified route, the request unit 41 generates a transfer request addressed to the transfer device 60*b*. The request unit 41 transmits the transfer request addressed to the transfer device 60*a* to the transfer device 60*a*, which is the starting point of the identified route, and transmits the transfer request addressed to the transfer device 60*b* to the transfer device 60*b*, which is the ending point of the identified route.

The selection unit 43 determines the quality information included in a packet obtained from the sorting unit 31, and thereby determines whether or not a packet including data of quality after the changing has arrived at the transfer device 60 serving as the starting point of the old route. When a packet including data of quality after the changing has arrived at the transfer device 60 serving as the starting point of the old route, the selection unit 43 performs a process for securing a new route. In this process, the selection unit 43 refers to the transfer rate table 52, the route management table 53 and the unoccupied route table 55 on an as-needed basis. The transfer rate table 52 stores a transfer rate of data transferred from the monitoring camera 10 for each operation mode. The unoccupied route table 55 records information of a route that will become a candidate for a new route. The route management table 53 records information of an old route and a new route. A method of securing a new route and specific examples of these tables will be explained later in detail. After securing a new route, the selection unit 43 performs, for the transfer device 60 serving as the starting point of the new route, a process for setting in such a manner that a packet addressed to the processing device 90 that has been received from the monitoring camera 10 after securing the new route is transferred to the processing device 90 by using the new route. This process will be explained later in detail. A packet transferred to the control device 20 after the setting of the new route is a packet coming from the transfer device 60 serving as the ending point of the old route. Accordingly, the selection unit 43 outputs, to the release control unit 44, a packet input from the sorting unit 31 after the setting of the new route without performing a determination process on that packet.

Further, the selection unit 43 records, in the last packet number table 54, a sequence number included in the last packet before the changing of the quality of data among packets transmitted from the monitoring camera 10 for which the quality of the data has been changed. Hereinafter, the last packet before the changing of the quality of data among packets transmitted from the monitoring camera 10 for which the quality of data has been changed is also referred to as a "last packet".

FIG. 8 illustrates an example of the last packet number table 54. The last packet number table 54 records identifiers of the monitoring cameras 10 that transmitted last packets in such a manner that the identifiers are associated with the sequence numbers in the last packets. FIG. 8 illustrates an example of the last packet number table 54 that is generated in a case where packets up to sequence number=123456 generated by the monitoring camera 10 of ODC#1 include data before the changing of the quality. When the last packet number table 54 illustrated in FIG. 8 is generated, the packet with sequence number=123457 and subsequent packets include data of quality after the changing.

The selection unit 43 outputs to the addition process unit 42 a packet used for a determination process. In a situation where a new route has not been selected, when a data packet has been input from the selection unit 43, the addition process unit 42 refers to the use status management table 51 so as to add to a data packet transfer information specifying, as the output destination, a port on the network side of the transfer device 60 on the starting point side of the old route. When a new route has been selected, the addition process unit 42 adds to a data packet transfer information specifying, as the output destination, a port on the network side of the transfer device 60 on the ending point side of the new route. Further, the addition process unit 42 outputs a packet to which control information has been added, to the transmitter 22 together with the number of the output port used for returning that packet to the transfer device 60 that transferred the packet to the control device 20. The process of the addition process unit 42 will be described later. The addition process unit 42 outputs the processed packet to the transmitter 22.

The release control unit 44 extracts the sequence number of the packet input from the selection unit 43, and determines whether or not the packet of the sequence number registered in the last packet number table 54 has arrived at the transfer device 60 that is the ending point of the old route. When the last packet was transferred from the transfer device 60 that is the ending point of the old route, the release control unit 44 determines that the transmission of packets to be transmitted to the processing device 90 by using the old route has been terminated. Then, the release control unit 44 generates a packet for releasing the old route. Hereinafter, a packet used for releasing an old route is also referred to as a "release instruction packet". The release control unit 44 transmits a release instruction packet to the transfer device 60 that is the ending point of the old route via the transmitter 22. Further, the release control unit 44 outputs a packet used for the determination process to the addition process unit 42. The addition process unit 42 adds, to the packet input from the release control unit 44, transfer information representing the transfer route used for the transfer to the processing device 90, and outputs the packet to the transmitter 22.

FIG. 9 illustrates an example of a configuration of the transfer device 60. The transfer device 60 includes a communication unit 61, a control unit 70 and a storage unit 80. The communication unit 61 includes a transmitter 62 and a receiver 63. The control unit 70 includes a sorting unit 71, a packet transfer unit 72, an identification unit 73 and a updating unit 74. The storage unit 80 includes a packet transfer table 81.

The transmitter 62 transmits, via the port specified by the packet transfer unit 72 or the identification unit 73, a packet input from the packet transfer unit 72 or the identification unit 73, and thereby transmits the packet toward a destination device. The receiver 63 receives a packet from a different transfer device 60, the control device 20, the monitoring camera 10 or the processing device 90. The receiver 63 outputs the received packet to the sorting unit 71 together with information of the input port of the packet.

The sorting unit 71 determines the output destination of the packet input from the receiver 63 in accordance with the type or the transmission source of the input packet. The sorting unit 71 outputs a packet not including an instruction from the control device 20 to the packet transfer unit 72 together with information of the input port of that packet. When the instruction included in the packet is transfer information specifying the transfer destination of the packet, the sorting unit 71 outputs that packet to the identification unit 73. Meanwhile, the sorting unit 71 outputs to the updating unit 74 a packet including an instruction from the control device 20 regarding changing of transfer routes. Hereinafter, a packet including an instruction regarding changing of transfer routes is also referred to as an "instruction packet".

FIG. 10 illustrates examples of the packet transfer table 81. A packet transfer table 81*a* is an example of the packet transfer table 81 included in the transfer device 60*a*. A packet transfer table 81*b* is an example of the packet transfer table 81 included the transfer device 60*b*. As illustrated in the packet transfer tables 81*a* and 81*b*, output destinations of input packets are associated with input ports in the packet transfer table 81. The packet transfer unit 72 refers to the packet transfer table 81 so as to output a packet input from the sorting unit 71 to the output port associated with the input port number. For example, the packet transfer table 81*a* tells that a packet received by the transfer device 60*a* via port Po2 is output via port Po15 of the transfer device 60*a*. Similarly, a packet received by the transfer device 60*b* via port Po10 is transmitted via port Po1 on the basis of reference to the packet transfer table 81*b* by a packet transfer unit 72*b*.

The identification unit 73 uses transfer information included in a packet to identify the transfer destination port. The identification unit 73 removes the transfer information from the packet whose transfer destination port has been identified, and outputs the packet to the transmitter 62 together with the information of the transfer destination port. Then, the transmitter 62 transmits, via the specified port, the packet transmitted from the identification unit 73. The updating unit 74 uses the packet input from the sorting unit 71 so as to update information in the packet transfer table 81. A specific example of updating the packet transfer table 81 will be explained later.

Figure 11:
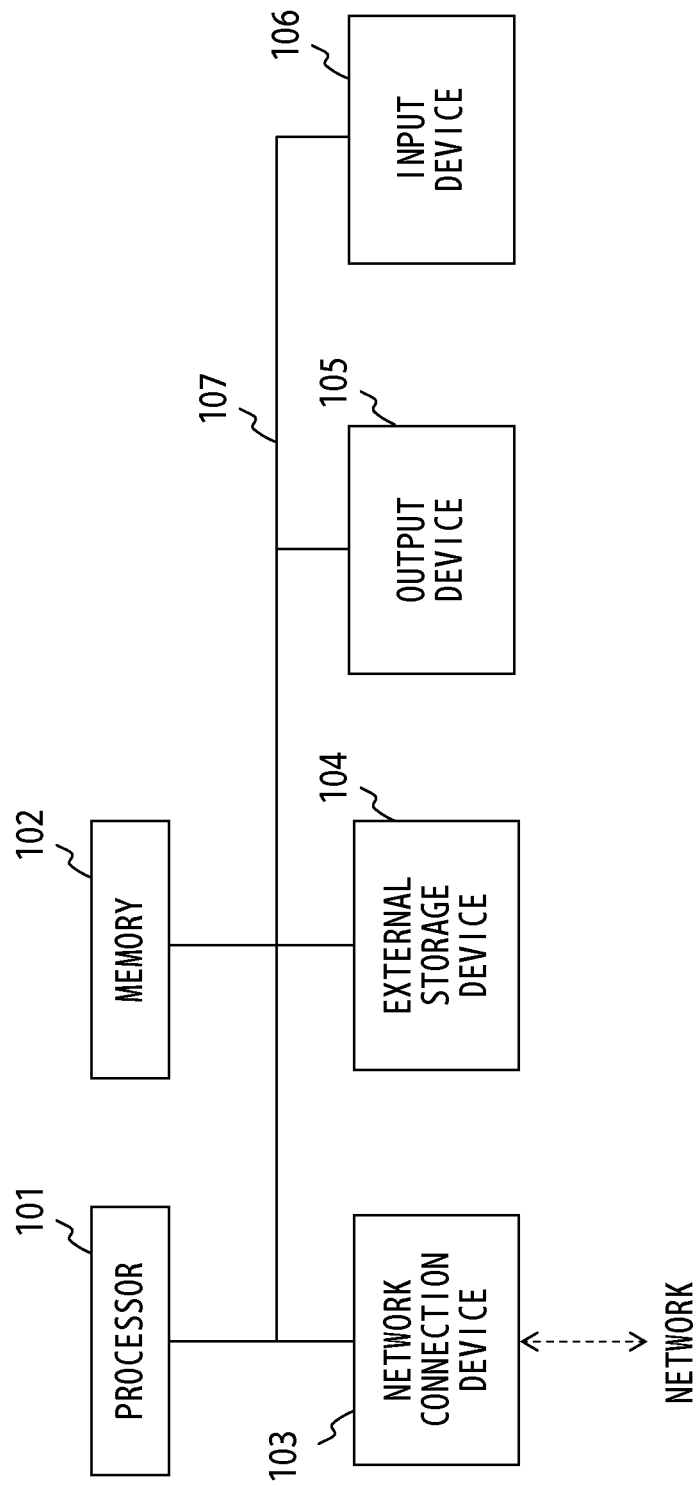
FIG. 11 illustrates an example of a hardware configuration of the control device and the processing device.

FIG. 11 illustrates an example of a hardware configuration of the control device 20 and the processing device 90. Each of the control device 20 and the processing device 90 includes a processor 101, a memory 102, a network connection device 103, an external storage device 104, an output device 105, an input device 106 and a bus 107. The bus 107 connects the processor 101, the memory 102, the network connection device 103, the external storage device 104, the output device 105 and the input device 106 in such a manner that data can be transmitted and received between them. The processor 101 may be an arbitrary processing circuit including a Central Processing Unit (CPU). In the control device 20, the processor 101 operates as the control unit 30 and the memory 102 operates as the storage unit 50. In the processing device 90, the processor 101 operates as the control unit 95 and the memory 102 operates as the storage unit 92. Also, the processor 101 can execute a program that is stored in for example the external storage device 104. The memory 102 also stores on an as-needed basis data obtained through operations of the processor 101 and data used for processes executed by the processor 101.

In the control device 20, the network connection device 103 is used for communications with other devices and operates as the transmitter 22 and the receiver 23. In the processing device 90, the network connection device 103 operates as the communication unit 91.

In both the control device 20 and the processing device 90, for example input device 106 is implemented as a button, a keyboard and a mouse, and the output device 105 is implemented as a display device etc. Also, a touch panel including the input device 106 and the output device 105 may be included in the control device 20 or the processing device 90. Also, in the control device 20, the output device 105 and the input device 106 are optional, and may be omitted in some cases in accordance with implementation. Both the control device 20 and the processing device 90 may be implemented by a computer.

FIG. 12 illustrates an example of a hardware configuration of the monitoring camera 10. The monitoring camera 10 includes the processor 101, the memory 102, the network connection device 103, the bus 107, an image capturing device 108 and a microphone 109. In the monitoring camera 10, the processor 101 operates as the determination unit 12, and the memory 102 operates as the storage unit 15. The data generating unit 13 is implemented by the processor 101, the image capturing device 108 and the microphone 109. The network connection device 103 operates as the communication unit 11. The bus 107 connects the processor 101 the memory 102, the network connection device 103, the image capturing device 108 and the microphone 109 in such a manner that data can be transmitted and received between them. The microphone 109 is optional, and the monitoring camera 10 does not have to include the microphone 109.

Figure 13:
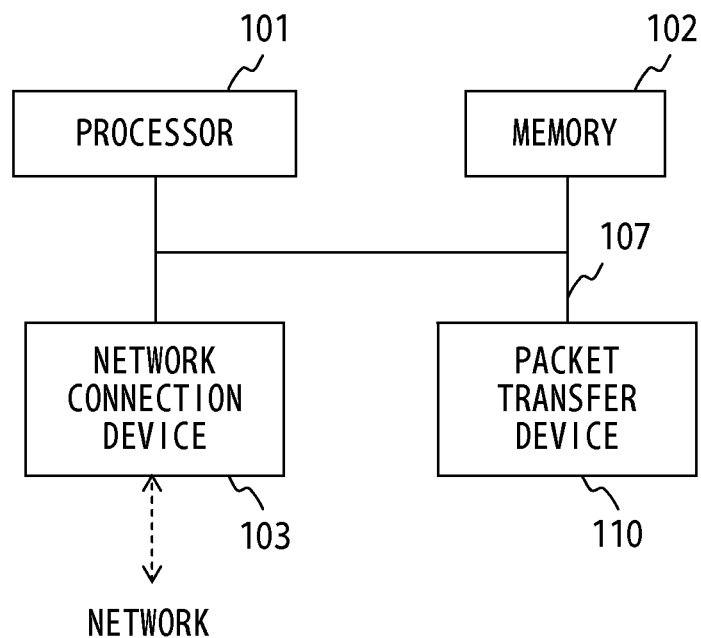
FIG. 13 illustrates an example of a hardware configuration of the transfer device.

FIG. 13 illustrates an example of a hardware configuration of the transfer device 60. The transfer device 60 includes the processor 101, the memory 102, the network connection device 103, the bus 107 and a packet transfer device 110. The processor 101 operates as the sorting unit 71, the identification unit 73 and the updating unit 74. The packet transfer unit 72 may be implemented by the processor 101 and the packet transfer device 110 in some cases, and also may be implemented by the packet transfer device 110. The packet transfer device 110 may be for example a switch circuit. The memory 102 operates as the storage unit 80. The network connection device 103 operates as the transmitter 62 and the receiver 63.

<Transfer Process>

Hereinafter, explanations will be given for processes of a device in a network by categorizing those processes into processes executed before the changing of quality, processes for changing quality, processes of a report packet, determination of the type of data included in a packet being transferred, securing of a route to be used newly and releasing of a used route. Now, explanations will be given for a transfer process executed in a case where an operator using the processing device 90 to monitor image data or audio data transmitted from the monitoring camera 10 makes higher the quality of data transmitted from the monitoring camera 10 to the processing device 90. It is assumed hereinafter that the monitoring camera 10 receiving a request that the quality of data be changed is the monitoring camera 10 that is identified by ODC#1. It is also assumed that the operation mode before the monitoring camera 10 of ODC#1 receives a request that the quality of data be changed is a normal mode. Further, in the explanations below, for the sake of understanding of the explanations, data related to ODC#1 may be extracted from among pieces of information in each table and be illustrated together with a transfer process in a network. For example, when explanations are given for the changing of the packet transfer table 81 in accordance with the process or a search process for a last packet by using the last packet number table 54, data of ODC#1 may be illustrated in an extracted manner. However, it is assumed that all the tables include information related to communications between the monitoring camera 10 of the ODC#1 and the processing device 90 on an as-needed basis.

In the explanations below, in order to facilitate the discrimination between the transfer device 60 that is performing a process from the other transfer devices 60, the letter that is assigned to the transfer device 60 performing a process is added to the numeral. For example, a packet transfer unit 72*a* is the packet transfer unit 72 that is included in the transfer device 60*a*.

(1) Process Performed before the Changing of Quality

FIG. 14 illustrates an example of a transfer process. In the following example, port Po1 is connected to the monitoring camera 10 and port Po48 is connected to the control device 20 in the transfer device 60*a*. Also, in the transfer device 60*b*, port Po1 is connected to the processing device 90 and port Po48 is connected to the control device 20. Further, it is assumed that route R1 that connects port Po10 of the transfer device 60*a* and port Po20 of the transfer device 60*b* is being used as the transfer route of a packet, addressed to the processing device 90, transmitted from the monitoring camera 10. Accordingly, the packet transfer table 81*a*-1 included in the transfer device 60*a* has recorded that a packet input via port Po1 of the transfer device 60*a* is output via port Po10. Meanwhile, the packet transfer table 81*b*-1 included in the transfer device 60*b* has recorded that a packet input via port Po20 of the transfer device 60*b* is output via port Po1.

Because a normal mode is set in the monitoring camera 10, the data generating unit 13 refers to a condition associated with a normal mode in the quality parameter table 16 (FIG. 4), and generates image data or audio data to be transmitted to the processing device 90. In this example, the data generating unit 13 generates data that is a result of compressing, by using H.264 codec, data whose transfer rate is 256 kbps, whose frame rate is 2 fps, and whose window size is 600×480 pixels. Further, the data generating unit 13 generates a data packet, including the generated data, addressed to the processing device 90.

FIG. 15 illustrates examples of a packet format and a packet. F1 in FIG. 15 denotes an example of a format of a data packet. F2 denotes an example of a request packet that requests that the monitoring camera 10 change the transfer rate. A request packet in which a header addressed to the control device 20 is added to the payload is a report packet that reports the changing of a transfer rate. F3 and F4 are examples of packets including instructions related to the changing of a route (instruction packet). Among instruction packets, a packet requesting that the transfer device 60 transfer a received packet to the control device 20 is also referred to as a "transfer request packet" in some cases. Also, among instruction packets, a packet used for instructing release of an old route is also referred to as a "release instruction packet" in some cases. Now, explanations are given for format F1 of a data packet, and F2, F3 through F5 will be explained by referring to FIG. 16, FIG. 18, and FIGS. 18 and 19, respectively.

F1 in FIG. 15 denotes an example of a data format of a data packet. A data packet includes a header, a sequence number, quality information and data. A header is set in accordance with the protocol used for transmission and reception of the data packet, and includes a destination address, a transmission source address, a type field, etc. A type field stores information for uniquely identifying the type of a packet. A sequence number is used for identifying the transmission order of data packets. Sequence numbers are set in accordance with the order of the packets transmitted from the monitoring camera 10 regardless of the transfer rate or quality of data included in the packets transmitted from the monitoring camera 10. Quality information may be arbitrary information that is associated with the transfer rate of the data so that the transfer rate of the data can be uniquely identified by the control device 20 or the processing device 90. In the example below, the operation mode of the monitoring camera 10 used when data in a data packet was generated is used as the quality information.

It is assumed that the data generating unit 13 generated packet Pa10 including the following pieces of information.
Destination address: the address of the processing device 90
Transmission source address: the address of the monitoring camera 10 (ODC#1)
Quality information: normal
Sequence number: 10
The data generating unit 13 outputs packet Pa10 to the communication unit 11. The communication unit 11 transmits packet Pa10 toward the processing device 90.

It is assumed that packets Pa11 and Pa12 were generated in the data generating unit 13 of the monitoring camera 10 while the transfer process was being conducted on packet Pa10. Then, packets Pa11 and Pa12 are also transmitted toward the processing device 90 from the communication unit 11 similarly to packet Pa10. Accordingly, packets Pa10 through Pa12 are transmitted toward the transfer device 60a from the monitoring camera 10 as illustrated in FIG. 14.

A receiver 63a of the transfer device 60a receives packet Pa10 via port Po1. The receiver 63a outputs packet Pa10 to a sorting unit 71a together with information indicating that the input port is Po1. Because packet Pa10 is not a packet received via the port (Po48) connected to the control device 20, the sorting unit 71a outputs to the packet transfer unit 72a packet Pa10 together with information indicating that the input port is port Po1. The packet transfer unit 72a refers to the packet transfer table 81a-1 so as to determine port Po10 as the output port of packet Pa10. The packet transfer unit 72a outputs packet Pa10 to a transmitter 62a together with information specifying port Po10 as the output port of packet Pa10. The transmitter 62a transmits packet Pa10 via port Po10 of the transfer device 60a. Accordingly, packet Pa10 is transferred to the transfer device 60b through route R1 as illustrated in FIG. 14.

A receiver 63b of the transfer device 60b receives packet Pa10 via port Po20. Then, the receiver 63b outputs packet Pa10 to a sorting unit 71b together with information indicating that the input port is port Po20. The sorting unit 71b outputs packet Pa10 to the packet transfer unit 72b together with information indicating that the input port is port Po20. The packet transfer unit 72b refers to the packet transfer table 81b-1 so as to determine port Po1 as the output port of packet Pa10, and outputs packet Pa10 to a transmitter 62b together with information of the output port. The transmitter 62b transmits packet Pa10 via port Po1 of the transfer device 60b, and thereby transfers packet Pa10 to the processing device 90.

Receiving packet Pa10, the communication unit 91 of the processing device 90 outputs the packet to the packet process unit 98. The packet process unit 98 uses the transmission source address of packet Pa10 so as to identify that the transmission source monitoring camera 10 is the camera of ODC#1. The packet process unit 98 searches the monitoring status table 93 (FIG. 6) by using the identifier of the camera as a key, and obtains the operation mode of the camera from among obtained entries. In the example illustrated in FIG. 6, the operation mode of the camera of ODC#1 is a normal mode. Accordingly, the packet process unit 98 refers to the quality parameter table 94 (FIG. 4) so as to obtain information such as the type of the compression codec of the packet transmitted from the monitoring camera 10 in its normal mode or a logical window size and to process, on the basis of the obtained information, packet Pa10 and other packets that have already been obtained from the camera of ODC#1. The packet process unit 98 outputs the obtained data to the output device 105. The output device 105 displays the input data from the packet process unit 98 on the window of the display device.

Figure 16:
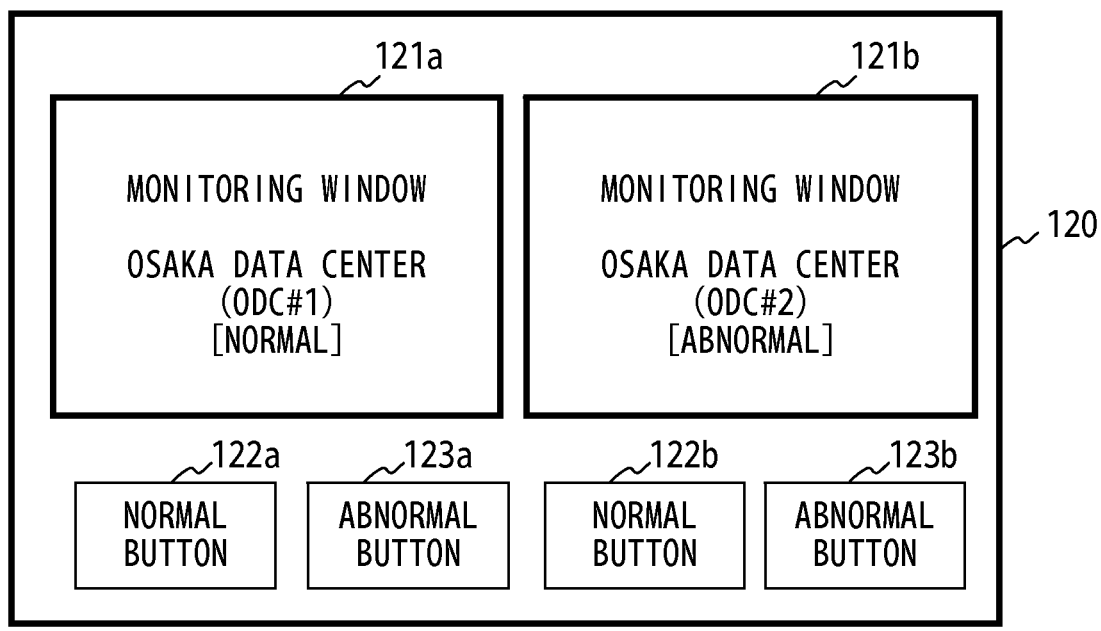
FIG. 16 illustrates an example of a display window displayed in the processing device.

FIG. 16 illustrates an example of a display window 120 displayed in a processing device. The display window 120 includes monitoring windows 121 (121a, 121b), normal buttons 122 (122a, 122b) and abnormal buttons 123 (123a, 123b). FIG. 16 illustrates an example of a case where the display window 120 includes two monitoring windows; the monitoring windows 121a and 121b, however, the number of the monitoring windows 121 included in the display window 120 may be changed arbitrarily. In FIG. 16, the monitoring window 121a displays an image from the monitoring camera 10 of ODC#1 installed of the Osaka data center while the monitoring window 121b displays an image from the monitoring camera 10 of ODC#2 of the Osaka data center. The monitoring window 121 may display the states of cameras that are transmitting the images being displayed in the windows in the monitoring window 121. In the example illustrated in FIG. 16, the operation mode of the monitoring camera 10 of ODC#1 is a normal mode, and the operation mode of the monitoring camera 10 of ODC#2 is an abnormal mode. The operator uses the normal button 122a when the operation mode of the monitoring camera 10 that is transmitting data to the monitoring window 121a is to be set to a normal mode, and uses the abnormal button 123a when the operation mode of that camera is to be set to an abnormal mode. Similarly, when the operation mode of the monitoring camera 10 (ODC#2) that is transmitting data to the monitoring window 121b is to be set to a normal mode, the normal button 122b is used, and when the operation mode of that camera is to be set to an abnormal mode, the abnormal button 123b is used. It is assumed in this example that because the image in the monitoring window 121a depicted a suspicious thing, the operator has selected the abnormal button 123a in order to switch the operation mode of ODC#1 from a normal mode to an abnormal mode.

The input device 106 reports to the mode switching unit 96 the information input by the operator. The mode switching unit 96 uses the display position of the graphical user interface (GUI) in the display window 120 and the information reported from the input device 106 so as to determine that the abnormal button 123a has been selected. The mode switching unit 96 refers to the monitoring status table 93 (FIG. 6) in order to determine whether or not it has been requested that the operation mode be changed. Because the operation mode of the monitoring camera 10 of ODC#1 is a normal mode in the monitoring status table 93, the mode switching unit 96 determines that it has been requested that the operation mode be changed. The mode switching unit 96 generates a request packet for requesting that the monitoring camera 10 of ODC#1 change the operation mode and a report packet for reporting, to the control device 20, the changing of the operation mode of the monitoring camera 10 of ODC#1.

F2 in FIG. 15 denotes an example of a request packet and a report packet. A request packet and a report packet each include a header, an instruction type, a monitoring camera number and padding. An instruction type field stores information identifying the type of the packet. A value in the instruction type field of a request packet generated in this example is a value requesting that the operation mode of the monitoring camera 10 identified by the monitoring camera number be changed from a normal mode to an abnormal mode. Further, the monitoring camera number field stores the value of ODC#1. Also, the mode switching unit 96 sets the destination address in the header of a request packet as the address of the monitoring camera 10 of ODC#1. Information in the payload of a report packet is similar to that in a request packet addressed to the monitoring camera 10 of ODC#1. However, the destination address in the header of a report packet is set in the control device 20. The mode switching unit 96 outputs a request packet and a report packet to the communication unit 91. The communication unit 91 transmits the request packet to the monitoring camera 10 of ODC#1 and transmits the report packet toward the control device 20.

(2) Changing of Quality in the Monitoring Camera 10 and Processing of a Report Packet in the Control Device 20

First, explanations will be given for the changing of quality in the monitoring camera 10. Receiving a request packet, the communication unit 11 of the monitoring camera 10 outputs the request packet to the determination unit 12. The determination unit 12 analyzes the payload of the request packet and determines that it has been requested that the operation mode of ODC#1 be switched to an abnormal mode. Then, the determination unit 12 requests that the data generating unit 13 generate a packet corresponding to an abnormal mode.

Receiving the request from the determination unit 12, the data generating unit 13 obtains from the quality parameter table 16 (FIG. 4) a generating condition of data such as a frame rate etc. of data specified in an abnormal mode. The data generating unit 13 switches the generating condition of data to the obtained condition. Accordingly, a packet that is newly generated includes data that results from compressing, by using H.264 codec, data whose transfer rate is 1024 kbps, whose frame rate is 60 fps, and whose window size is 1024×800 pixels. In the explanations below, it is assumed that the packet with sequence number=13 and subsequent packets are generated in an abnormal mode.

Next, explanations will be given for processing of a report packet in the control device 20. Receiving a report packet, the receiver 23 outputs the packet to the sorting unit 31. Because the transmission source of the packet is the processing device 90, the sorting unit 31 outputs the report packet to the determination unit 32. The determination unit 32 uses the instruction type field of the input packet so as to determine whether or not the input packet is a report packet. Because a report packet including the information denoted by F2 in FIG. 15 has been input to the determination unit 32 in this example, the instruction type field has stored information instructing the switching to an abnormal mode. Accordingly, the determination unit 32 determines that a report packet has been input, and outputs to the request unit 41 the monitoring camera number of the monitoring camera 10 for which it is requested that the operation mode be changed and the operation mode of the monitoring camera 10 identified by that monitoring camera number.

Obtaining the monitoring camera number of the monitoring camera 10 whose operation mode is to be changed and the operation mode after the changing, the request unit 41 refers to the use status management table 51 so as to identify the route that is used currently (old route).

FIG. 17 illustrates an example of the use status management table 51. In the use status management table 51, the identifier of the monitoring camera 10 and information of a route used for data transmission are associated for each of the monitoring cameras 10 that transmit data to the processing device 90 via the carrier network 2. In other words, the use status management table 51 stores information of old routes of packets addressed to the processing device 90 by the monitoring camera 10 for which it was requested that the quality be changed. Information of old routes is expressed as a combination of the transfer device 60a that receives a packet addressed to the processing device 90 from the monitoring camera 10, the transfer device 60b that transfers packets to the processing device 90 and ports used for transferring packets in those transfer devices.

The control device 20 manages respective routes as routes in a linear network configuration, and identifies one route on the basis of a combination of a port on the side of the network of the first transfer device 60 and a port on the side of the network of the second transfer device 60. Accordingly, while the use status management table 51 does not include information on the transfer devices 60 in a route connecting the transfer device 60a to which the monitoring camera 10 is connected and the transfer device 60b to which the processing device 90 is connected, the request unit 41 can identify the route that is being used currently by referring to the use status management table 51.

The request unit 41 refers to the first entry in FIG. 17 so as to identify that a packet transmitted by the monitoring camera 10 of ODC#1 to the processing device 90 is received by the transfer device 60a via port Po1 and is transferred toward the processing device 90 via port Po10. Further, the request unit 41 also identifies, on the basis of the first entry in FIG. 17, that a packet, addressed to the processing device 90, that was output via port Po10 of the transfer device 60a is received by the transfer device 60b via port Po20 and is transmitted to the processing device 90 via port Po1. Then, the request unit 41 determines that the route between port Po10 of the transfer device 60a and port Po20 of the transfer device 60b is a route that is changed in accordance with the transfer rate of data.

The request unit 41 generates a transfer request packet addressed to the transfer device 60a so that the control device 20 can obtain a packet transmitted from the monitoring camera 10 to the transfer device 60a, which serves as the starting point of a route to be changed. F3 in FIG. 15 denotes an example of a transfer request packet addressed to the transfer device 60a. A transfer request packet includes a header, an instruction type, an input port number, an output port number and padding. In an instruction type field, a value representing the changing of a transfer route is set. In an output port field, the number of a port connected to the control device 20 among ports of the destination transfer device 60a is recorded. In an input port field, the number of an input port of a packet output to the port of the number recorded in the output port field is recorded. In other words, a transfer request packet is used for requesting that a packet input via the port having the number of the value described in the input port field among ports of the destination transfer device 60 be output via the port connected to the control device 20. By transmitting the packet denoted by F3 in FIG. 15 to the transfer device 60a, the control device 20 can request that the transfer device 60a output, via port Po48 connected to the control device 20, a packet input via port Poi of the transfer device 60a.

Further, the request unit 41 also generates a transfer request packet addressed to the transfer device 60b so that the control device 20 can obtain a packet that is obtained by the transfer device 60b from the transfer device 60a by using an old route. F4 in FIG. 15 denotes an example of a transfer request packet addressed to the transfer device 60b. A transfer request packet addressed to the transfer device 60b has a format similar to that of a transfer request packet addressed to the transfer device 60a. By transmitting the packet denoted by F4 in FIG. 15 to the transfer device 60b, the control device 20 can request that the transfer device 60b output, via port Po48 connected to the control device 20, a packet input via port Po20 of the transfer device 60*b*.

The request unit 41 outputs the generated transfer request packet to the transmitter 22. The transmitter 22 transmits the transfer request packet to the transfer device 60 specified by the destination address in the header. Accordingly, the packet denoted by F3 in FIG. 15 is transmitted to the transfer device 60*a* and the packet denoted by F4 in FIG. 15 is transmitted to the transfer device 60*b*.

(3) Determination of the Type of Data Included in a Packet Received by the Transfer Device 60

Figure 18:
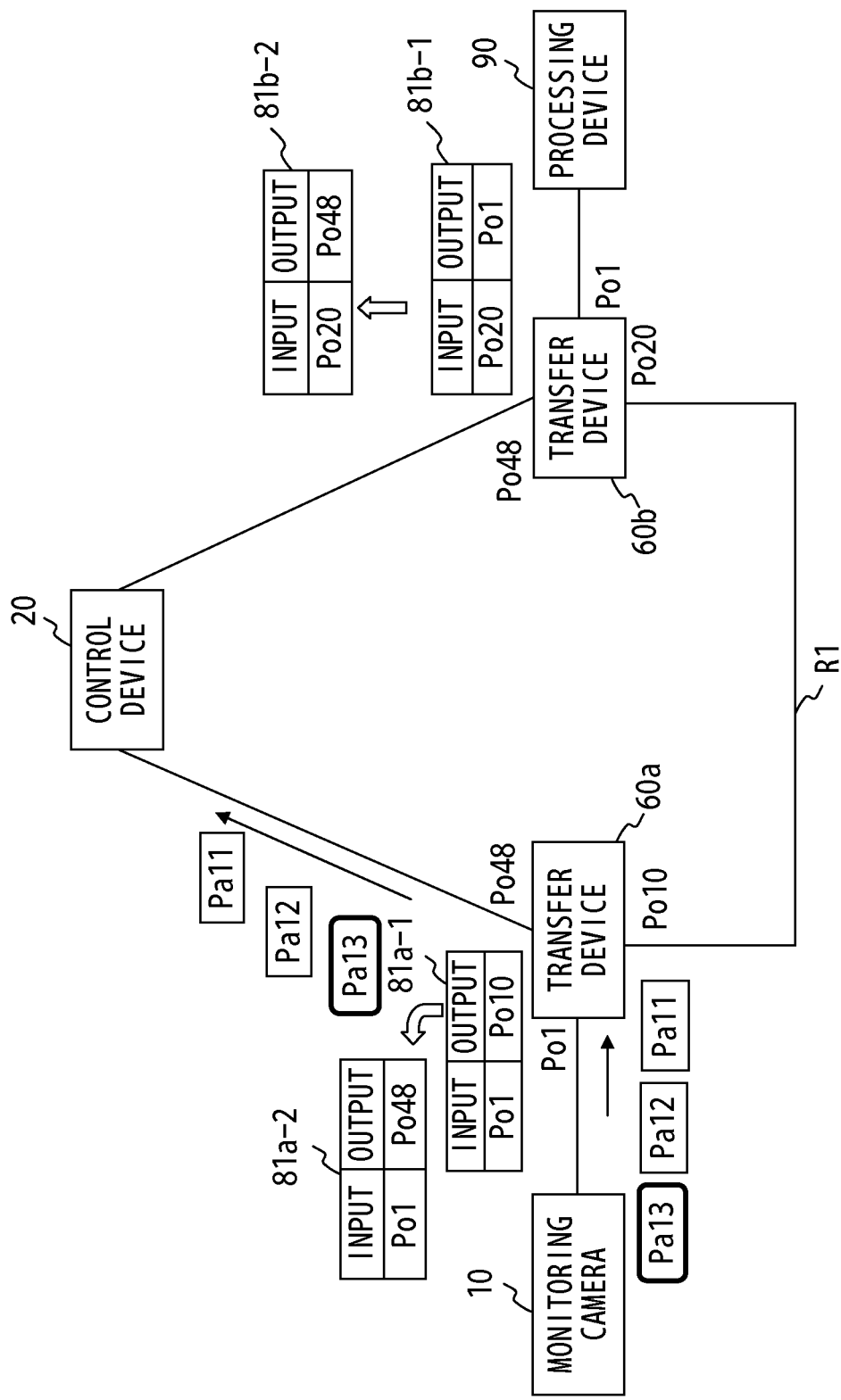
FIG. 18 illustrates an example of a transfer process executed for conducting determination of quality information.

FIG. 18 illustrates an example of a transfer process executed for conducting determination of quality information. By referring to FIG. 18, explanations will be given for a process executed when the transfer device 60 changes the packet transfer table 81 by using a transfer request packet and a transfer process executed by the control device 20 for determination of the quality of a received packet in the transfer device 60.

The receiver 63*a* of the transfer device 60*a* receives a transfer request packet via port Po48 and outputs the transfer request packet to the sorting unit 71*a*. The sorting unit 71*a* refers to the instruction type of an input packet so as to determine that a packet used for changing the packet transfer table 81*a* has been input. Accordingly, the sorting unit 71*a* outputs the transfer request packet to an updating unit 74*a*. The updating unit 74*a* uses the packet input from the sorting unit 71*a* and updates the information in the packet transfer table 81*a*-1. FIG. 18 illustrates the updating of the packet transfer table 81*a*-1 to the packet transfer table 81*a*-2. A packet input to port Po*t* of the transfer device 60*a* after the completion of the process of the updating unit 74*a* is output toward the control device 20 via port Po48.

Accompanying the reception of a transfer request packet, processes similar to those described regarding the transfer device 60*a* are performed in the transfer device 60*b* as well. Accordingly, as illustrated in FIG. 18, an updating unit 74*b* updates the packet transfer table 81*b*-1 to the packet transfer table 81*b*-2. Thus, a packet input to port Po20 of the transfer device 60*b* after the termination of the process of updating unit 74*b* is output toward the control device 20 via port Po48.

It is assumed as illustrated in FIG. 18 that packets Pa11 through Pa13 arrived at the transfer device 60*a* after the termination of the updating process of the packet transfer table 81 performed by the updating unit 74*a*. Note that packet Pa13 is a data packet generated after the operation mode was switched to an abnormal mode in the monitoring camera 10 of ODC#1. The receiver 63*a* of the transfer device 60*a* receives all of packets Pa11 through Pa13 via port Po1. The receiver 63*a* outputs each of packets Pa11 through Pa13 to the sorting unit 71*a* together with information that the input port is port Po1. Because none of packets Pa11 through Pa13 is a packet received from the control device 20, the sorting unit 71*a* outputs those packets to the packet transfer unit 72*a*. For each of packets Pa11 through Pa13, the packet transfer unit 72*a* determines the output port in accordance with the packet transfer table 81*a*-2, and outputs those packets to the transmitter 62*a* together with information about the output ports. Accordingly, all of packets Pa11 through Pa13 are transmitted toward the control device 20 via port Po48 as illustrated in FIG. 18.

Next, by using an example in which packet Pa11 has arrived at the control device 20, explanations will be given for a process that is executed by the control device 20 when a packet of quality before the changing has been obtained from the transfer device 60 serving as the starting point of an old route.

When receiving packet Pa11, the receiver 23 of the control device 20 outputs packet Pa11 to the sorting unit 31. The sorting unit 31 outputs packet Pa11 to the selection unit 43. Because the transmission source address of packet Pa11 is the address of the monitoring camera 10 (ODC#1), the selection unit 43 determines whether or not the quality information has been set to an abnormal mode in order to determine whether or not the packet is a packet including data of quality after the changing. Because packet Pa11 is a packet generated before the operation mode of the monitoring camera 10 (ODC#1) is set to an abnormal mode, the quality information in packet Pa11 is a normal mode. Accordingly, the selection unit 43 determines that there is a possibility that packet Pa11 is the last packet, and sets the value corresponding to the monitoring camera 10 of ODC#1 in the last packet number table 54 to "11". Further, the selection unit 43 outputs packet Pa11 to the addition process unit 42.

When a data packet has been input from the selection unit 43, the addition process unit 42 determines that a packet transmitted from the transfer device 60*a* on the starting point side of the old route has been input. Further, because it has not been reported by the selection unit 43 that a new route has been set, the addition process unit 42 determines that the input packet will be transmitted from the starting point to the ending point of the old route. Accordingly, the addition process unit 42 refers to the use status management table 51 so as to identify the starting point of the old route associated with the monitoring camera number (ODC#1) of the transmission source camera 10. According to the use status management table 51 illustrated in FIG. 17, the starting pint of the old route set for ODC#1 is port Po10 of the transfer device 60*a*. Therefore, the addition process unit 42 adds, to a process target packet, information specifying port Po10 as the output port as information of transfer route. F5 in FIG. 15 denotes an example of a packet to which transfer information has been added by a process executed by the addition process unit 42. A packet to which transfer information has been added includes a header, an instruction type, an output port number, a sequence number, quality information and data. In a packet to which transfer information has been added (F5), the header, the sequence number, the quality information and data are similar to those included in the packet input to the addition process unit 42. In other words, when a data packet denoted by F1 has been input, as depicted in FIG. 15, the addition process unit 42 inserts an instruction type and an output port number into between the header and the sequence number in the data packet. In this example, the instruction type field stores information indicating that the instruction is a transfer instruction, and the output port information specifies an output port in the transfer destination transfer device 60. Because the output port from the transfer device 60*a* is Po10 in the explanation using FIG. 18, the addition process unit 42 generates the packet denoted by F5 illustrated in FIG. 15.

The addition process unit 42 identifies the port number of the port used by the control device 20 for communication with the transfer device 60*a* to transfer the packet to which transfer information has been added to the transfer device 60*a*. It is assumed that information of devices connected to respective ports of the control device 20 is stored in advance in the storage unit 50 as topology information (not illustrated). The addition process unit 42 outputs to the transmitter 22 the packet to which transfer information has been added, together with the port number of the port used for communication with the transfer device 60*a*. The transmitter 22 outputs the input packet via the port specified by the addition process unit 42. The transmitter 22 performs a process of transmitting a packet via the port specified by the addition process unit 42, and thereby packet Pa11 including transfer information is transmitted toward the transfer device 60*a* from the control device 20.

Next, it is assumed that packet Pa12 has arrived at the control device 20 from the transfer device 60*a*. Packet Pa12 is processed similarly as packet Pa11. Accordingly, the sequence number of the last packet for the monitoring camera 10 of ODC#1 in the last packet number table 54 is updated to "12" in response to the fact that the control device 20 received packet Pa12 (see FIG. 19). Further, similarly to packet Pa11, packet Pa12 is transferred to the transfer device 60*a* together with information indicating that the output port in the transfer device 60*a* is port Po10.

FIG. 19 illustrates an example of a transfer process of a packet and setting of a route. By referring to FIG. 19, explanations will be given for a transfer process of a packet that was transmitted from the control device 20 to the transfer device 60*a* after the determination process and the securing of a new route. Arrow A1 in FIG. 19 denotes transfer of packet Pa11 including transfer information and packet Pa12 including transfer information, the transfer being toward the transfer device 60*a* from the control device 20. As illustrated in FIG. 19, transfer information added to packet Pa11 is information indicating that the output port of packet Pa11 is Po10. Also, in transfer information added to the packet Pa12, it is recorded that the output port of packet Pa12 is Po10.

The receiver 63*a* of the transfer device 60*a* receives packet Pa11 including transfer information from port Po48. The receiver 63*a* outputs, to the sorting unit 71*a*, the received packet together with information indicating that the reception port is port Po48. The sorting unit 71*a* outputs the input packet to the identification unit 73 because the input packet includes transfer information.

An identification unit 73*a* identifies that port Po10 is specified as the output port of the input packet. In the example illustrated in FIG. 19, further by deleting transfer information from the input packet, the identification unit 73*a* reproduces packet Pa11 transmitted from the monitoring camera 10. The identification unit 73*a* outputs to the transmitter 62*a* packet Pa11 not including transfer information together with information indicating that the output port of the packet Pa11 is port Po10. Accordingly, as denoted by arrow A2 in FIG. 19, packet Pa11 is output via port Po10 of the transfer device 60*a*. Because port Po10 of the transfer device 60*a* is the starting point of the old route denoted by R1 in FIG. 19, packet Pa11 is transmitted toward port Po20 of the transfer device 60*b* through the old route.

The transfer device 60*a* performs, on packet Pa12, processes similar to those performed on packet Pa11. Because port Po10 is specified as the output port as transfer information in packet Pa12, packet Pa12 is also transmitted toward port Po20 of the transfer device 60*b* through the old route similarly to packet Pa11.

Next, by using an example in which the control device 20 has received packet Pa13 after the transfer process of packets Pa11 and Pa12 to which transfer has been added has been terminated, a process performed when a packet including data of quality after the changing has first been detected in the control device 20 will be explained.

The receiver 23 of the control device 20 outputs received packet Pa13 to the sorting unit 31. The sorting unit 31 outputs packet Pa13 to the selection unit 43. Because the transmission source of packet Pa13 is the monitoring camera 10 (ODC#1), the selection unit 43 determines the type of the quality information. Because packet Pa13 was generated after the operation mode of the monitoring camera 10 (ODC#1) was set to an abnormal mode, the quality information in packet Pa13 represents an abnormal mode. Then, the selection unit 43 determines that packet Pa13 is the packet that first arrived at the transfer device 60*a* among packets generated by the monitoring camera 10 after the changing of the setting. Because the selection unit 43 detected the packet that first arrived at the transfer device 60*a* among packets generated by the monitoring camera 10 after the changing of the setting, the selection unit 43 starts a process for securing a route (new route) used for transferring a packet including data of quality after the changing.

Note that the selection unit 43 does not change the value of the last packet regarding ODC#1 in the last packet number table 54 because packet Pa13 is a packet generated after the changing of quality. Accordingly, in the changing of the quality in the monitoring camera 10 of ODC#1, the sequence number of the last packet is fixed to "12".

(4) Securing of a Route Used for Transferring Data of Quality after Being Changed Hereinafter, explanations will be given for a process executed by the control device 20 in order to secure a new route. The selection unit 43 refers to the transfer rate table 52 in order to obtain a transfer rate of data of quality after the changing.

FIG. 20 illustrates an example of the transfer rate table 52. The transfer rate table 52 records transfer rates that are required for transferring data in packets transmitted from the monitoring cameras 10 in such a manner that those transfer rates are associated with operation modes recorded in the quality information fields of those packets. According to FIG. 20, the transfer rate of data generated in a normal mode is 256 kbps, while the transfer rate of data generated in an abnormal mode is 1024 kbps. The selection unit 43 determines to set the transfer rate through a new route to be equal to or higher than 1024 kbps because data was generated in an abnormal mode in packets after the changing of the data quality in the monitoring camera 10 of ODC#1.

FIG. 21 illustrates an example of the unoccupied route table 55. In the unoccupied route table 55, combinations between the starting points and ending points of routes that are not used are associated with the maximum values allowed as the transfer rates for using those routes. For example, transfer of packets at 1024 kbps is possible through the route from port Po12 of the transfer device 60*a* to port Po16 of the transfer device 60*b*, while the route from port p13 of the transfer device 60*a* to port Po17 of the transfer device 60*b* only permits packet transfer at a transfer rate equal to or lower than 512 kbps. Also, packet transfer equal to or lower than 2048 kbps is possible through the route from port Po21 of the transfer device 60*a* to port Po18 of the transfer device 60*b*.

The selection unit 43 selects, as a new route, a route that correspond to a transfer rate equal to or higher than the transfer rate after the changing of the quality and that has a relatively lower transfer rate from among routes registered in the unoccupied route table 55. In this example, the transfer rate of data becomes 1024 kbps after the data quality has been changed in the monitoring camera 10. Accordingly, the selection unit 43 selects the entry of No. 1 in the unoccupied route table 55 as a new route. The selection unit 43 associates the selected route with information of quality information=abnormal, and stores the information in the route management table 53. Further, the selection unit 43 also stores, in the route management table 53, information of the old route that is being used for transferring a packet including data generated in the monitoring camera 10 of ODC#1.

FIG. 22 illustrates an example of the route management table 53. The route management table 53 records a piece of information of a route that can be used for each of the monitoring cameras 10 for which the switching of transfer routes in accordance with its data transfer rate has not been terminated, from among the monitoring cameras 10 to which the changing of quality of data was requested. Each route is associated with a monitoring camera number for identifying the monitoring camera 10 that generated data transferred through the route and quality information. FIG. 22 illustrates an example of the route management table 53 used for a case when the selection unit 43 records information of a new route and an old route for a packet including data generated in the monitoring camera 10 of ODC#1. In other words, the transfer route of a packet including data generated while the monitoring camera 10 of ODC#1 is in a normal mode is an old route, and accordingly is the route from port Po10 of the transfer device 60a to port Po20 of the transfer device 60b. Meanwhile, the transfer route of a packet including data generated in the monitoring camera 10 of ODC#1 while it is in an abnormal mode is a route selected by the selection unit 43 as a new route, and is the route from port Po12 of the transfer device 60a to port Po16 of the transfer device 60b. In FIG. 19, R2 denotes a route selected by the selection unit 43 as a new route.

Figure 23:
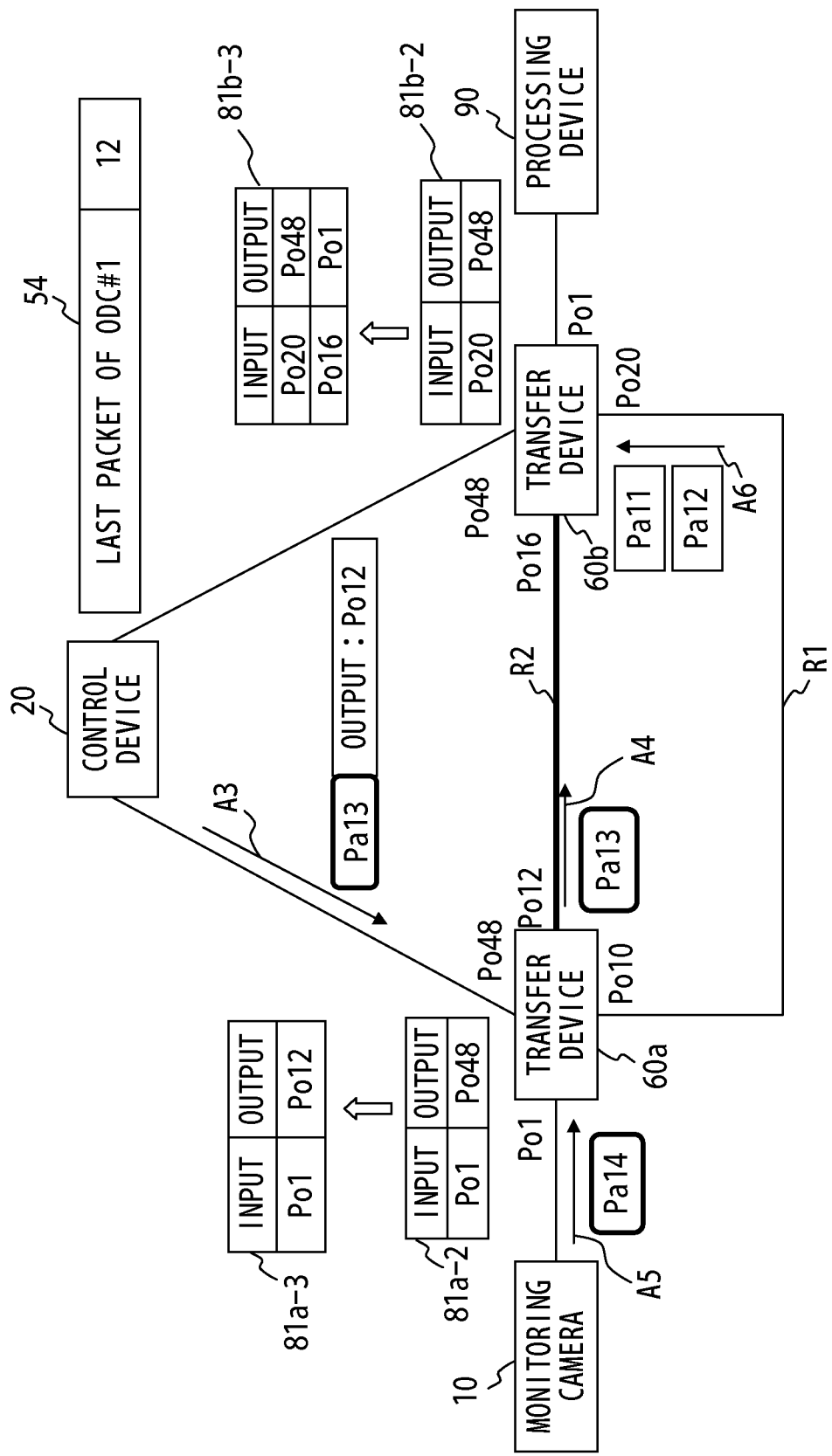
FIG. 23 illustrates an example of a transfer process using a new route and a method of setting the transfer device.

FIG. 23 illustrates an example of a transfer process using a new route and a method of setting the transfer device 60. When a new route has been secured, the selection unit 43 outputs packet Pa13 to the addition process unit 42. In this process, the selection unit 43 outputs to the addition process unit 42 information indicating that the transfer route of packet Pa13 is a new route, together with packet Pa13.

In order to add transfer information to packet Pa13, the selection unit 43 refers to the route management table 53 (FIG. 22). The addition process unit 42 uses the transmission source address of packet Pa13 so as to identify that the data in packet Pa13 was generated in the monitoring camera 10 of ODC#1. Further, the addition process unit 42 also identifies, from the quality information in packet Pa13, that the data in packet Pa13 was generated in an abnormal mode. The addition process unit 42 searches from the route management table 53 a transfer route of a packet of quality that is associated with an abnormal mode and the monitoring camera 10 of ODC#1. Because the route from port Po12 of the transfer device 60a to port Po16 of the transfer device 60b is obtained as a result of the search, the addition process unit 42 adds, to packet Pa13, information indicating that the output port in the transfer device 60a is port Po12. Further, the addition process unit 42 provides packet Pa13 an instruction type field and records the fact that the instruction is a transfer instruction in the instruction type field. The addition process unit 42 outputs to the transmitter 22 packet Pa13 to which the transfer information has been added, together with the port number of the port used for the communication with the transfer device 60a. By the transmitter 22 performing a transmission process via the port specified by the addition process unit 42, packet Pa13 including transfer information is transmitted from the control device 20 toward transfer device 60a as denoted by arrow A3 in FIG. 23.

The process performed by the receiver 63a and the sorting unit 71a when packet Pa13 including transfer information has been received is similar to that performed on packet Pa11 including transfer information. Thus, packet Pa13 including transfer information is output to the identification unit 73a.

The identification unit 73a identifies that port Po12 is specified as the output port for the input packet. The identification unit 73a removes the instruction type field and the output port field from the input packet, and thereby reproduces packet Pa13 transmitted from the monitoring camera 10. The identification unit 73a outputs, to the transmitter 62a, packet Pa13 not including transfer information and information indicating that the output port of packet Pa13 is port Po12. Accordingly, packet Pa13 is output via port Po12 of the transfer device 60a as denoted by arrow A4 in FIG. 23. Port Po12 of the transfer device 60a is the starting point of the new route denoted by R2 in FIG. 23, and accordingly packet Pa13 is transmitted toward port Po16 of the transfer device 60b via the new route.

Next, the control device 20 starts a setting process so that it is made possible for the transfer device 60a to perform a process of transferring a packet by using new route R2 even when the control device 20 does not specify a transfer destination port. Hereinafter, explanations will be given for an example of a setting process performed by the control device 20 and the transfer device 60a.

The selection unit 43 of the control device 20 has received a packet including data after the changing of quality from the transfer device 60a, and accordingly determines that data included in a packet that the transfer device 60a thereafter receives from the monitoring camera 10 is data of quality after the changing. Accordingly, the selection unit 43 determines to make the transfer device 60a being a starting point of the new route transmit a packet received from the monitoring camera 10 to the transfer device 60b via new route R2. The selection unit 43 generates an instruction packet including the following information for the transfer device 60a. The format of an instruction packet is as denoted by F3 and F4 in FIG. 15.

Destination address: the address of the transfer device 60a
Transmission source address: the address of the control device 20
The instruction type: changing of a transfer route
The input port number: 1
The output port number 12
The selection unit 43 outputs to the transmitter 22 the generated instruction packet together with the information of the port used for communication with the transfer device 60a. Because the transmitter 22 transmits the instruction packet via the reported port, the instruction packet is transmitted to the transfer device 60a.

Receiving the instruction packet, the transfer device 60a performs processes similar to those performed when a transfer request packet has been received. Specifically, the updating unit 74a obtains the instruction packet via the receiver 63a and the sorting unit 71a. Because it is instructed in the input instruction packet that a packet input to port Po1 be output via port Po12, the updating unit 74a changes the packet transfer table 81a in accordance with the instruction in the instruction packet. In other words, the updating unit 74a updates the packet transfer table 81a-2 to the packet transfer table 81a-3 as illustrated in FIG. 23. Accordingly, the packet received by the transfer device 60a from the monitoring camera 10 after the updating of the packet transfer table 81a is transferred to the transfer device 60b through new route R2 instead of being transferred to the control device 20.

Next, accompanying the transfer device 60a starting the transfer process through new route R2, the control device 20 requests that the transfer device 60*b* conduct setting for transferring to processing device 90 the packet received through new route R2. Hereinafter, explanations will be given for an example of a process executed by the control device 20 and the transfer device 60*b*.

The selection unit 43 of the control device 20 refers to the use status management table 51 (FIG. 17) so as to identify the port, in the transfer device 60*b* serving as the ending point of new route R2, via which transfer packets are output to the processing device 90. In the example illustrated in FIG. 17, the port number of the port via which the transfer device 60*b* outputs packets addressed to the processing device 90 is "1". Accordingly, in order to conduct setting so that packets to be input to the transfer device 60*b* through new route R2 is output to port Po1, the selection unit 43 generates an instruction packet including the following information.

Destination address: the address of the transfer device 60*b*
Transmission source address: the address of the control device 20
Instruction type: changing of a transfer route
Input port number: 16
Output port number: 1

The selection unit 43 outputs to the transmitter 22 the generated instruction packet together with the information of the port used for communication with the transfer device 60*b*. Because the transmitter 22 transmits the instruction packet via the reported port, the instruction packet is transmitted to the transfer device 60*b*.

The process of an instruction packet performed by the transfer device 60*b* is also similar to those performed by the transfer device 60*a*. Specifically, the updating unit 74*b* obtains an instruction packet via the receiver 63*b* and the sorting unit 71*b*. Because it is instructed in the input instruction packet that a packet input to port Po16 be output via port Po1, the updating unit 74*b* updates the packet transfer table 81*b*-2 to the packet transfer table 81*b*-3 in accordance with the instruction in the instruction packet. Accordingly, after the updating of the packet transfer table 81*b*, the transfer device 60*b* transfers to the processing device 90 a packet received through new route R2.

It is also possible to employ a configuration in which a packet including data after the changing of quality is transmitted toward the processing device 90 from the monitoring camera 10 on an as-needed basis even while the process explained in FIG. 23 is being executed. For example, packet Pa14 is being transmitted toward the transfer device 60*a* from the monitoring camera 10 as denoted by arrow A5 in the example of FIG. 23.

(5) Releasing of a Used Route

In FIG. 23, it is assumed that packet Pa11 and packet Pa12 have arrived at the transfer device 60*b* as denoted by arrow A6 in FIG. 23 before packet Pa13 arrives at the transfer device 60*b* through new route R2. The process performed thereafter will be explained by referring to FIG. 24.

FIG. 24 illustrates an example of a method of detecting timing for releasing a route. Because the transfer device 60*b* receives packet Pa11 through old route R1, the input port for packet Pa11 is port Po20. The receiver 63*b* in the transfer device 60*b* outputs packet Pa11 to the sorting unit 71*b*. Because packet Pa11 does not include an instruction from the control device 20, the sorting unit 71*b* outputs packet Pa11 to the packet transfer unit 72*b*. Because the packet transfer unit 72*b* determines the output port in accordance with the packet transfer table 81*b*-3, the output port for packet Pa11 is port Po48. The packet transfer unit 72*b* outputs to the transmitter 62*b* packet Pa11 together with information indicating that the output port of packet Pa11 is port Po48. The transmitter 62*b* transmits packet Pa11 via port Po48. In this situation, because port Po48 of the transfer device 60*b* is connected to the control device 20, packet Pa11 is transferred to the control device 20. The process performed when the transfer device 60*b* received packet Pa12 is similar to that performed on packet Pa11. Accordingly, packet Pa12 is also transferred to the control device 20 following procedures similar to those for packet Pa11.

Next, by using an example where packets Pa11 and Pa12 transmitted from the transfer device 60*b* have arrived at the control device 20, explanations will be given for a process performed when the control device 20 determines timing for releasing an old route.

It is first assumed that the selection unit 43 of the control device 20 obtained packet Pa11 via the sorting unit 31 and the receiver 23. When the selection unit 43 has identified that the transmission source address of packet Pa11 is the address of the monitoring camera 10 (ODC#1), the selection unit 43 refers to the route management table 53 (FIG. 22) and determines whether or not a new route has been set. Because a plurality of routes have been set for the monitoring camera 10 (ODC#1) in the route management table 53 in this example, the selection unit 43 determines that new route R2 has been set. Then, the selection unit 43 determines that packet Pa11 is a packet used for determining timing for releasing a route, and outputs packet Pa11 to the release control unit 44.

The release control unit 44 determines whether or not the sequence number in input packet Pa11 matches with the sequence number of the last packet obtained regarding the monitoring camera number (ODC#1) that is the transmission source of packet Pa11. As illustrated in the last packet number table 54 of FIG. 24, the sequence number of the last packet regarding ODC#1 is "12", and accordingly the release control unit 44 determines that packet Pa11 is not the last packet. The fact that the control device 20 receives from the transfer device 60*b* a packet including a sequence number smaller than that of the last packet indicates that communication using old route R1 has not been terminated. Accordingly, the release control unit 44 determines that it has not become possible to release old route R1. The release control unit 44 outputs packet Pa11 to the addition process unit 42.

When a data packet has been input from the release control unit 44, the addition process unit 42 determines that a packet transferred from the transfer device 60 serving as the ending point of the old route has been input. Then, the addition process unit 42 refers to the use status management table 51 (FIG. 17) so as to obtain a port number, associated with the monitoring camera number (ODC#1) of the transmission source monitoring camera 10, that is used by the transfer device 60 for communication with the processing device 90. In the use status management table 51 illustrated in FIG. 17, the ending point of the old route set for ODC#1 is included in the transfer device 60*b*. Further, the transfer device 60*b* is performing communication with the processing device 90 via port Po1. Accordingly, the addition process unit 42 adds, to a process target packet, information specifying port Po1 as an output port as information of a transfer route. The format of a packet to which transfer information has been added is as denoted by F5 in FIG. 15. The addition process unit 42 associates packet Pa11 including transfer information with the port number of the port used for communication with the transfer device 60*b*, and transmits packet Pa11 to the transmitter 22. Then, the transmitter 22 transmits packet Pa11 including transfer information to the transfer device 60b as denoted by arrow A8 in FIG. 24.

Next, it is assumed that packet Pa12 has arrived at the control device 20. Because packet Pa12 receives a sorting process similar to that performed on packet Pa11, the release control unit 44 obtains packet Pa12 via the receiver 23, the sorting unit 31 and the selection unit 43.

The release control unit 44 determines whether or not the sequence number in input packet Pa12 matches with the sequence number in the last packet for the transmission source (ODC#1) of packet Pa12 by referring to the last packet number table 54. As illustrated in FIG. 24, the sequence number of the last packet for ODC#1 is "12", and the sequence number in packet Pa12 is also "12". Accordingly, the release control unit 44 determines that packet Pa12 is the last packet. The fact that the control device 20 receives the last packet from the transfer device 60b indicates that the reception of packets including data before the changing of quality in the transfer device 60b has been terminated and that communication using old route R1 has been terminated. Accordingly, the release control unit 44 determines that it has become possible to release old route R1. The release control unit 44 start a process for releasing old route R1.

Note that because the release control unit 44 outputs packet Pa12 to the addition process unit 42 in parallel to the process for releasing old route R1, packet Pa12 is also transmitted to the transfer device 60b from the control device 20 by a process similar to that for packet Pa11. Also, even during a process for identifying timing for performing a releasing process, processes such as a transfer process (arrow A9) performed by the transfer device 60a by using new route R2, a transmission process of a new packet from the monitoring camera 10, etc. may be performed.

Figure 25:
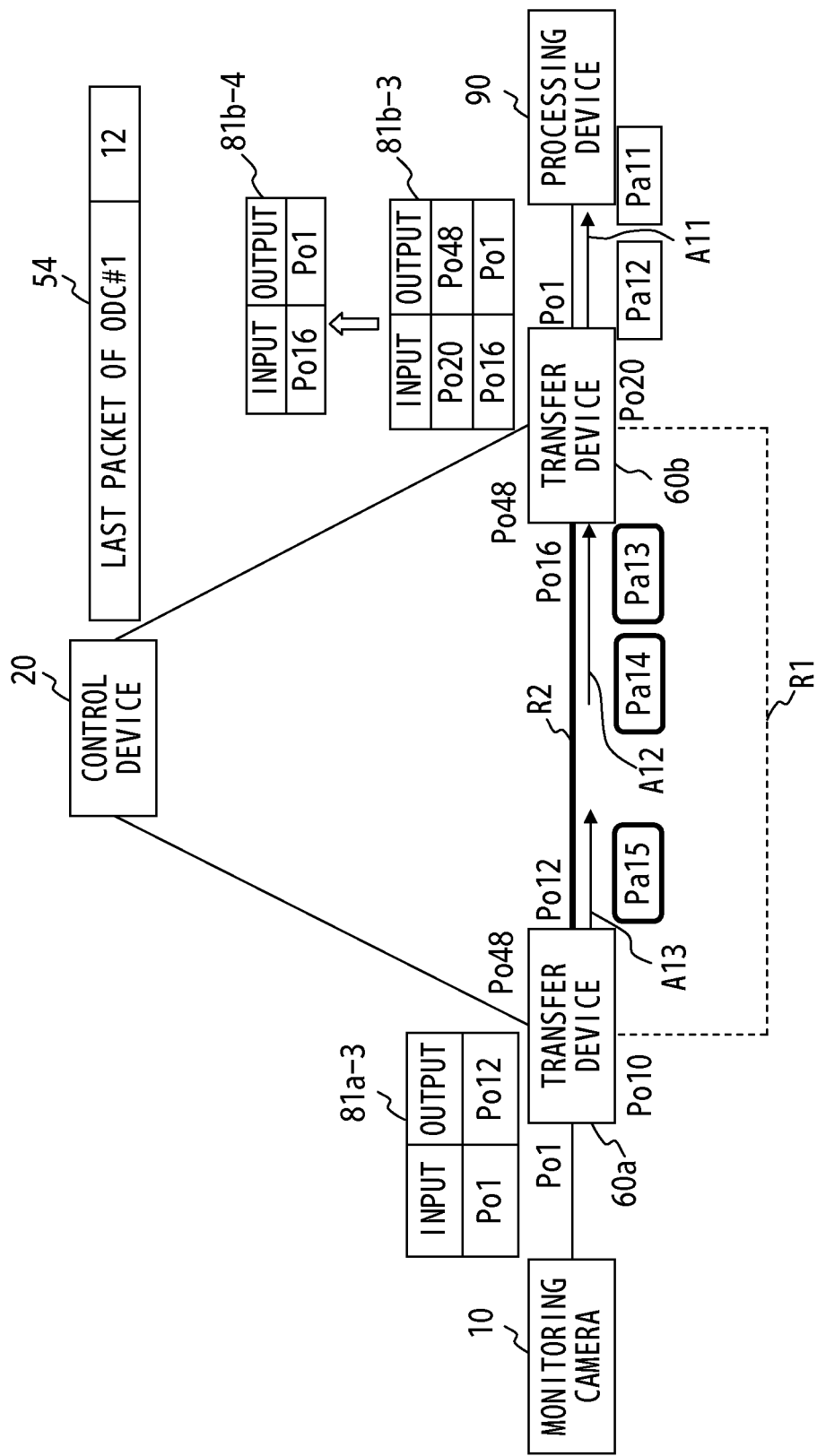
FIG. 25 illustrates an example of a process for releasing a route.

FIG. 25 illustrates an example of a process for releasing a route. When the release control unit 44 has determined that communication using old route R1 has been terminated, the release control unit 44 generates a release instruction packet for requesting that the transfer device 60b release the transfer route. The release instruction packet includes for example the following information.
Destination address: the address of the transfer device 60b
Transmission source address: the address of the control device 20
Instruction type: releasing of a route
Port serving as ending point of route: port Po20
The release control unit 44 transmits the generated release instruction packet to the transfer device 60b via the transmitter 22.

When the release control unit 44 has output the release instruction packet to the transmitter 22, the release control unit 44 performs a process for adding information of old route R1 to the unoccupied route table 55. In this process, the release control unit 44 refers to the transfer rate table 52 so as to obtain a transfer rate by using as the key the quality associated in old route R1 in the route management table 53. For example, the quality information associated with the old route R1 in the route management table 53 of FIG. 22 is a normal mode. Meanwhile, the transfer rate table 52 (FIG. 20) stores the fact that the transfer rate in a normal mode is 256 kbps. Accordingly, the release control unit 44 adds the following information to the unoccupied route table 55, and releases old route R1.
Transfer rate that can be used: 256 kbps
Unoccupied port number of the transfer device 60a: 10
Unoccupied port number of the transfer device 60b: 20

Next, explanations will be given for a process performed by the transfer device 60b when a release instruction packet has been received from the control device 20. The updating unit 74b of the transfer device 60b obtains a release instruction packet via the receiver 63b and the sorting unit 71b similarly to a case when a transfer request packet or other instruction packets have been received. The updating unit 74b recognizes from the input release instruction packet that the route having port Po20 as an ending point will be released. Accordingly, sorting unit 71b deletes, from the packet transfer table 81b-3, the information of port Po20 and information of a port that is the transfer destination of a packet received from port Po20. This process updates the packet transfer table 81b-3 to the packet transfer table 81b-4 as illustrated in FIG. 25.

By this process, the situation becomes a situation in which a transfer destination of packets input via port Po20 has not been identified in the transfer device 60b. In the transfer device 60a as well, as the packet transfer table 81a-3 illustrates, a transfer condition of specifying port Po10 as an output port is not stored. Accordingly, old route R1 from port Po10 of the transfer device 60a to port Po20 of the transfer device 60b becomes an unoccupied route, which is not being used.

It is also assumed that a transfer process of a packet directed to the processing device 90 by the monitoring camera 10 has also been performed on an as-needed basis in parallel to the releasing of old route R1. Arrow A11 in FIG. 25 denotes a process in which the transfer device 60b transfers packets Pa11 and Pa12 for which an output port has been specified by the control device 20 in the process explained in FIG. 24 to the processing device 90 via specified port Po01. Arrows A12 and A13 denote a process in which packets Pa12 through Pa15 including data after changing of quality are transferred from the transfer device 60a to the transfer device 60b through new route R2.

FIG. 26 illustrates an example of releasing of a route. Because the process for releasing old route R1 has been terminated, new route R2 becomes the only route that is used between the transfer device 60a and the transfer device 60b for communication of the processing device 90 and the monitoring camera 10. Accordingly, as denoted by arrow A14, a packet that has arrived at the transfer device 60b via new route R2 is transferred to the processing device 90 by the packet transfer unit 72b by referring to the packet transfer table 81b-4. Also, as denoted by arrow A15, packets thereafter received by the transfer device 60b receive a transfer process similar to that performed on packets Pa13 and Pa14 until the quality of data is changed again.

Figure 27:
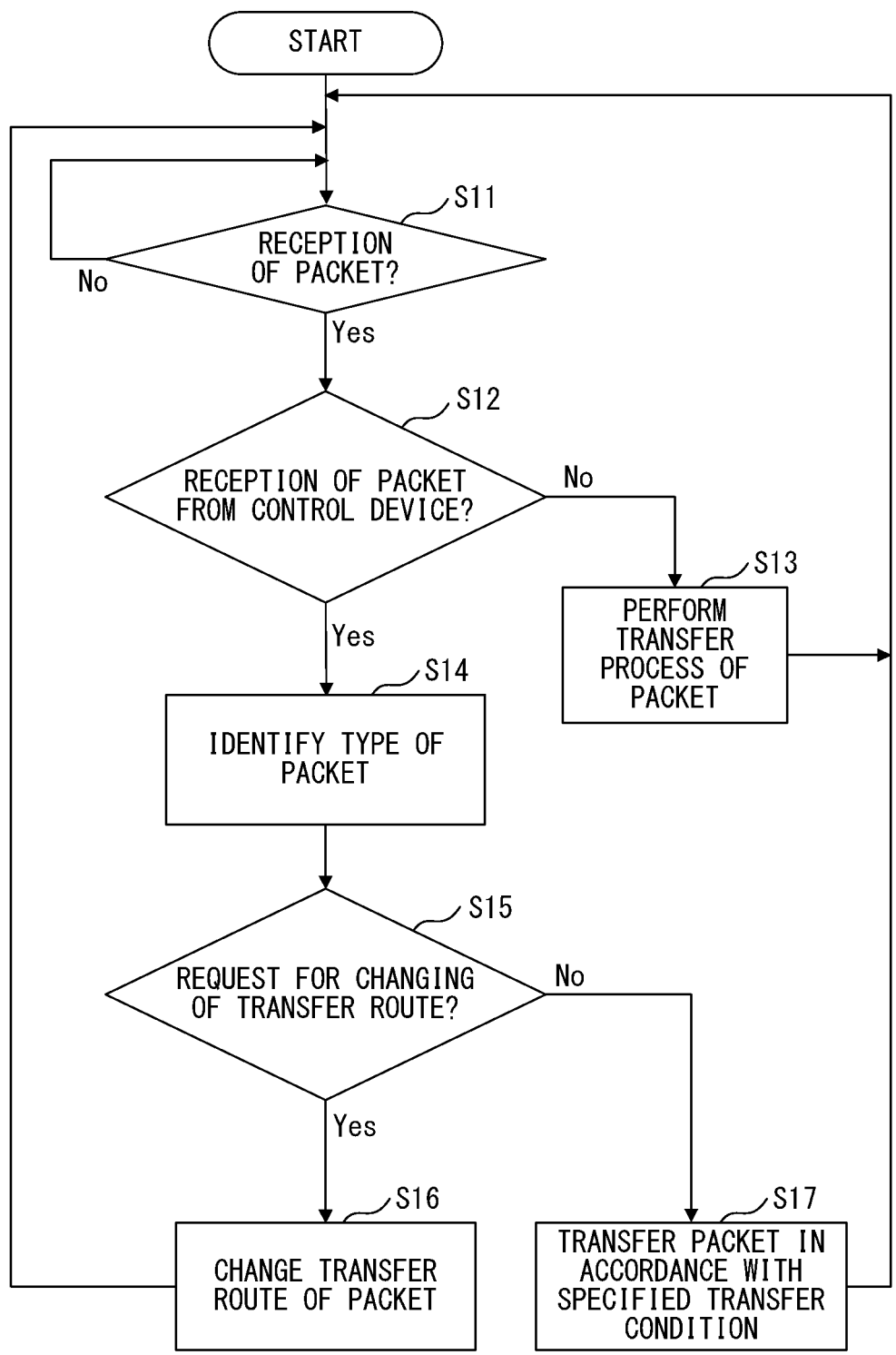
FIG. 27 is a flowchart illustrating an example of a process performed by a transfer device.

FIG. 27 is a flowchart illustrating an example of a process of the transfer device 60. The transfer device 60 waits until it receives a packet (No in step S11). Receiving a packet, the receiver 63 outputs the packet to the sorting unit 71 (Yes in step S11). The sorting unit 71 determines whether or not a packet has been received from the control device 20 (step S12). When a packet has not been received from the control device 20, the sorting unit 71 outputs a packet to the packet transfer unit 72 (No in step S12). The packet transfer unit 72 transfers a packet input from the sorting unit 71 in accordance with the packet transfer table 81 (step S13).

When a packet has been received from the control device 20, the sorting unit 71 refers to the instruction type in the packet and thereby identifies the type of the packet (Yes in step S12 and the process proceeds to step S14). When the packet is an instruction packet including an instruction regarding changing of a transfer route, the updating unit 74 updates the packet transfer table 81 in accordance with the instruction packet (Yes in step S15 and the process proceeds to step S16). When the packet is not an instruction packet including an instruction regarding changing of a transfer route, the process target packet is a packet including information specifying a transfer condition in the control device 20 (No in step S15). Then, the identification unit 73 identifies an output port from the specified transfer condition and performs a transfer process via the transmitter 62 (step S17). After the process of any of steps S13, S16 and S17, the processes in and after step S11 are repeated.

Figure 28B:
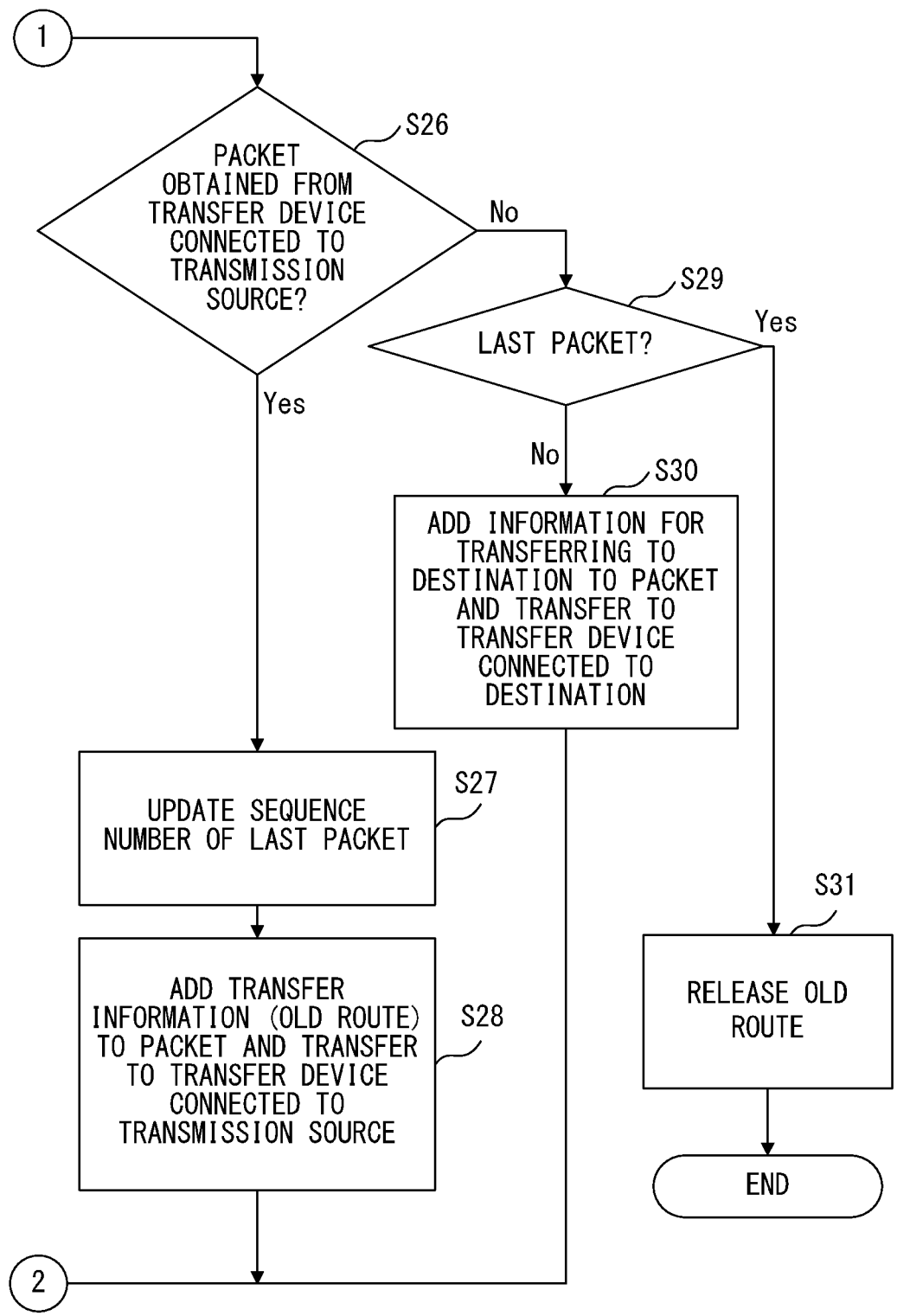

FIGS. 28A and 28B are a flowchart illustrating an example of a process performed by the control device 20. In FIGS. 28A and 28B, the processing device 90 is described as "destination" and the monitoring camera 10 is described as "transmission source". Note that it is possible to make a modification on this flowchart such as switching the order of steps S27 and S28.

The control device 20 waits until the changing of the quality of data generated in the monitoring camera 10 is reported from the processing device 90 (No in step S21). When the changing of the quality of data has been reported, the request unit 41 identifies the transfer route that is currently used (Yes in step S21 and the process proceeds to step S22). The request unit 41 starts monitoring packets received by the transfer device 60a that is connected to the transmission source in the current route and by the transfer device 60b that is connected to the destination, using the transfer request packet (step S23). When receiving a packet transferred from the transfer device 60, the selection unit 43 determines whether or not the packet transferred from the transfer device 60 is a packet including data of quality after being changed (step S24 and step S25). When the transferred packet is a packet not including data of quality after the changing, the selection unit 43 determines whether or not the packet is a packet obtained from the transfer device 60a connected to the monitoring camera 10 (No in step S25 and the process proceeds to step S26). When a process target packet has been obtained from the transfer device 60a connected to the monitoring camera 10 (transmission source), the selection unit 43 updates the sequence number of the last packet (Yes in step S26 and the process proceeds to step S27). The selection unit 43 outputs the process target packet to the addition process unit 42. The addition process unit 42 adds, to the input packet, information used for a process of transferring that packet through an old route, and transfers the packet to which the information has been added, to the transfer device 60a connected to the monitoring camera 10 (step S28).

When it has been determined in step S26 that a process target packet has been obtained from the transfer device 60b connected to the processing device 90 (destination), the selection unit 43 outputs the process target packet to the release control unit 44 (No in step S26). The release control unit 44 determines whether or not the process target packet is a last packet (step S29). When the process target packet is not a last packet, the release control unit 44 outputs the process target packet to the addition process unit 42 (No in step S29). The addition process unit 42 adds, to the input packet, information used for transferring that packet to the destination, and transfers the packet to which the information has been added, to the transfer device 60b connected to the destination (step S30). When the process target packet is the last packet, the release control unit 44 terminates the process after releasing the old route (step S31).

In step S25, when the transferred packet is a packet including data of quality after the changing, the selection unit 43 selects a new route used for transferring the packet including data of quality after the changing (step S32). The selection unit 43 transmits an instruction packet for instructing the setting of the new route to the transfer device 60a connected to the transmission source and the transfer device 60b connected to the destination so as to instruct the transfer device 60a and the transfer device 60b to set a new route (step S33). Further, the selection unit 43 outputs the process target packet to the addition process unit 42. The addition process unit 42 adds to the input packet information for performing transfer through the new route, and transfers the packet to which the information has been added, to the transfer device 60a connected to the transmission source (step S34).

Note that when any of steps S28, S30 and S34 has been terminated, the processes in and after step S24 are repeated.

As described above, according to the method of the embodiment, when transfer of a packet of quality that is transmitted and received through route R1 has been terminated, route R1 is released, and accordingly routes are switched in accordance with changes of the transfer rate and resources in the network are used efficiently. Therefore, the method of the embodiment increases the efficiency of communication processes. Further, because timing for switching transfer rates of data and timing for switching used routes coincide, packet losses do not occur due to a transfer rate of data exceeding the data amount that can be transferred per unit of time in the route.

Further, in the method of the embodiment, resources in a system can be utilized efficiently because routes whose use has been terminated are released without delay. Also, the securing of a new route is performed also by using an on-demand method using changing of the quality of data as a trigger. Accordingly, using the method of the embodiment makes it possible to operate a system by using a smaller amount of resources than other transfer systems. As described above, the method of the embodiment can transfer data by using the minimum amount of resources, and therefore is useful in reducing communication costs.

In the explanations referring to FIG. 2 and the subsequent figures, examples have been used in which the monitoring camera 10 serves as the transmission source of data and the processing device 90 serves as the destination, however, arbitrary combinations of devices that transmit and receive data at different transfer rates can be used as the transmission source and destination of data. The method of the embodiment can also be applied to a system for example in which a user terminal device serves as the destination and the quality of data such as image data, audio data, etc. transmitted by a server to the user is changed in response to a request from the user terminal device.

Although detailed explanations have been given for processes performed when the transfer rate increases due to changing of the quality of data, routes are changed in similar processes also when the transfer rate decreases due to changing of the quality of data.

As described above, by using the method of the embodiment, it is possible to increase the efficiency in communication in a system in which transfer rates change.

<Variation Example>

The embodiment is not limited to the above descriptions, and allows various modifications. Hereinbelow, examples thereof will be discussed.

Although the above explanations have given for examples where a packet including data after the changing of quality arrives at the transfer device 60a connected to the monitoring camera 10, timing for selecting a new route may be changed in accordance with implementation. For example, it is also possible to perform a process of selecting a new route when the control device 20 has received a report packet. In such a case, the determination unit 32 reports the reception of a report packet to the selection unit 43. Receiving a report of the reception of a report packet, the selection unit 43 performs a process of selecting a new route. A process of selecting a new route is as described above.

It is also possible to change the process of the control device 20 in such a manner that when releasing a used route, the control device 20 returns the setting of the release target old route to the state that had been recorded in the use status management table 51 before a transfer request was made to the control device 20, and thereafter releases the route. The process for such a case will be explained. When a last packet has been transferred from the transfer device 60b connected to the processing device 90, the release control unit 44 of the control device 20 determines to release the old route. Then, the release control unit 44 transmits to the transfer device 60b an instruction packet for changing the transfer destination of a packet input via the port serving as the ending point of the old route to a port connected to the processing device 90. In other words, because the output port used when the input port is port Po20 is port Po48 in the packet transfer table 81b-3 illustrated in FIG. 25, the release control unit 44 generates an instruction packet for returning, to port Po01, the output port used when the input port in the transfer device 60b is port Po20. In the transfer device 60b that has obtained the generated instruction packet, the packet transfer table 81b is updated in accordance with the instruction packet. After updating the packet transfer table 81b, the release control unit 44 requests that the control device 20b delete the setting of outputting packets via port Po20, serving as the ending point of the old route, to port Po1, and thereafter releases the old route.

Further, the packet formats and information items in tables that have been referred to in the explanations above are exemplary, and information items included in packets or information items included in tables may be changed in accordance with implementation.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A packet transfer system comprising:
a transmitter apparatus configured to transmit data packets including data and quality information associated with at least one transfer rate of the data;
a processing apparatus configured to process the data packets;
a first transfer apparatus configured to perform a transfer process of the data packets received from the transmitter apparatus;
a second transfer apparatus that is connected to the first transfer apparatus through a first route used for transferring a first data packet including first quality information associated with a first transfer rate and a second route used for transferring a second data packet including second quality information associated with a second transfer rate and that is configured to transfer the data packets received from the first transfer apparatus to the processing apparatus; and
a control apparatus configured to
control a route between the first transfer apparatus and the second transfer apparatus,
receive a report packet reporting that the processing apparatus requested that the transmitter apparatus change a transfer rate of the data,
request that the first transfer apparatus transfer the data packets received from the transmitter apparatus when the report packet has been received,
select the second route from among candidates for routes that can be used when the first data packet transferred from the first transfer apparatus includes the first quality information and the second data packet transferred from the first transfer apparatus subsequently to the first data packet includes the second quality information,
transmit, to the first transfer apparatus, a first instruction packet instructing to output the data packets received from the transmitter apparatus to the second route, and
transmit, to the second transfer apparatus, a second instruction packet instructing to transmit the data packets received through the second route to the processing apparatus,
wherein the second transfer apparatus releases the first route when reception of the first data packet including the first quality information has been terminated, the transmitter apparatus generates the second data packet including the second quality information that is addressed to the processing apparatus when the transmitter apparatus has received, while transmitting the first data packet including the first quality information that is addressed to the processing apparatus, a request packet requesting that the transfer rate of the data be changed from the processing apparatus, and the second route is set between the first transfer apparatus and the second transfer apparatus after the second data packet including the second quality information has been received by the first transfer apparatus.

2. The packet transfer system according to claim 1, wherein
the control apparatus:
includes a processor configured to add to the first data packet first port information representing an output port used by the first transfer apparatus for outputting a packet to the first route and to add to the second data packet second port information representing an output port used by the first transfer apparatus for outputting a packet to the second route; and
transmits, to the first transfer apparatus, the first data packet to which the first port information has been added and the second data packet to which the second port information has been added, and
the first transfer apparatus outputs the first data packet to a port specified by the first port information and outputs the second data packet to a port specified by the second port information.

3. The packet transfer system according to claim 1, wherein
the control apparatus:
requests that the second transfer apparatus transfer a received data packet received from the first transfer apparatus when the report packet has been received;

stores a sequence number included in the first data packet when the first data packet has been received from the first transfer apparatus; and determines to release the first route and transmits to the second transfer apparatus a release instruction packet for releasing the first route when the sequence number is included in the received data packet transferred from the second transfer apparatus, and the second transfer apparatus performs a process for releasing the first route when the release instruction packet has been received.

4. A packet transfer method comprising:

transmitting, by a transmitter apparatus, data packets including data and quality information associated with a transfer rate of the data to a processing apparatus that performs processing of the data packets, by a first transfer apparatus that has received the data packets from the transmitter apparatus, transferring a first data packet including first quality information associated with a first transfer rate to a first route, and transferring a second data packet including second quality information associated with a second transfer rate to a second route;

by a second transfer apparatus connected to the first transfer apparatus through the first and second routes, transferring to the processing apparatus the data packets received from the first transfer apparatus, and releasing the first route when reception of the first data packet including the first quality information has been terminated; and by a control apparatus that controls a route between the first transfer apparatus and the second transfer apparatus, requesting that the first transfer apparatus transfer the data packets received from the transmitter apparatus when a report packet reporting that the processing apparatus requested that the transmitter apparatus change a transfer rate of the data has been received, selecting the second route from among candidates for routes that can be used when the first data packet transferred from the first transfer apparatus includes first quality information and the second data packet transferred from the first transfer apparatus subsequently to the first data packet includes the second quality information, transmitting, to the first transfer apparatus, a first instruction packet instructing to output the data packets received from the transmitter apparatus to the second route, transmitting, to the second transfer apparatus, a second instruction packet instructing to transmit the data packets received through the second route to the processing apparatus, and setting the second route between the first transfer apparatus and the second transfer apparatus after the second data packet including the second quality information has been received by the first transfer apparatus, wherein the transmitter apparatus generates the second data packet including the second quality information that is addressed to the processing apparatus when the transmitter apparatus has received a request packet requesting that a transfer rate of the data be changed from the processing apparatus, while transmitting the data packet including the first quality information that is addressed to the processing apparatus.

5. The packet transfer method according to claim 4, wherein the control apparatus:

adds to the first data packet first port information representing an output port used by the first transfer apparatus for outputting a packet to the first route;

adds to the second data packet second port information representing an output port used by the first transfer apparatus for outputting a packet to the second route; and transmits, to the first transfer apparatus, the first data packet to which the first port information has been added and the second data packet to which the second port information has been added, and the first transfer apparatus outputs the first data packet to a port specified by the first port information and outputs the second data packet to a port specified by the second port information.

6. The packet transfer method according to claim 4, wherein the control apparatus:

requests that the second transfer apparatus transfer a received data packet received from the first transfer apparatus when the report packet has been received;

stores a sequence number included in the first data packet when the first data packet has been received from the first transfer apparatus; and generates a release instruction packet for instructing the second transfer apparatus to release the first route when the sequence number is included in the received data packet transferred from the second transfer apparatus;

transmits the release instruction packet to the second transfer apparatus, and the second transfer apparatus performs a process for releasing the first route when the release instruction packet has been received.

* * * * *